US008796390B2

(12) United States Patent
Clapper et al.

(10) Patent No.: US 8,796,390 B2
(45) Date of Patent: *Aug. 5, 2014

(54) GRAFTED COMPOUNDS FORMED FROM AZIRIDINYL-CONTAINING COMPOUNDS

(75) Inventors: Jason D. Clapper, Lino Lakes, MN (US); Kevin M. Lewandowski, Inver Grove Heights, MN (US); Mark F. Ellis, St. Paul, MN (US); Craig E. Hamer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/703,160

(22) PCT Filed: May 19, 2011

(86) PCT No.: PCT/US2011/037157
§ 371 (c)(1),
(2), (4) Date: Dec. 10, 2012

(87) PCT Pub. No.: WO2012/005814
PCT Pub. Date: Jan. 12, 2012

(65) Prior Publication Data
US 2013/0102731 A1    Apr. 25, 2013

Related U.S. Application Data

(60) Provisional application No. 61/359,516, filed on Jun. 29, 2010.

(51) Int. Cl.
*C08C 19/22* (2006.01)
*C08F 20/02* (2006.01)
*C08F 20/62* (2006.01)
*C08F 26/06* (2006.01)
*C08G 81/02* (2006.01)
*C08F 293/00* (2006.01)
*C08L 101/08* (2006.01)
*C08F 265/04* (2006.01)
*C08L 101/02* (2006.01)

(52) U.S. Cl.
CPC .............. *C08F 265/04* (2013.01); *C08G 81/02* (2013.01); *C08F 293/005* (2013.01); *C08L 101/08* (2013.01); *C08L 101/025* (2013.01)
USPC ..................... 525/375; 525/329.7; 525/326.7; 526/258

(58) Field of Classification Search
USPC ..................... 525/375, 329.7, 326.7; 526/258
See application file for complete search history.

(56) References Cited

U.S. PATENT DOCUMENTS

| | | |
|---|---|---|
| 2,390,165 A | 12/1945 | Orthner |
| 2,507,837 A | 5/1950 | Tadych |
| RE24,906 E | 12/1960 | Ulrich |
| 3,475,388 A * | 10/1969 | Yocum ........................... 525/377 |
| 3,507,837 A * | 4/1970 | Hidinger Jr. ................... 528/336 |
| 4,070,354 A * | 1/1978 | Dick et al. ...................... 548/967 |
| 4,619,979 A | 10/1986 | Kotnour |
| 4,843,134 A | 6/1989 | Kotnour |
| 5,057,366 A | 10/1991 | Husman |
| 5,106,993 A * | 4/1992 | Kania ............................ 548/967 |
| 5,115,035 A * | 5/1992 | Shiraki et al. ................. 525/314 |
| 5,637,646 A | 6/1997 | Ellis |
| 5,712,331 A * | 1/1998 | Ryang ............................ 523/400 |
| 5,804,610 A | 9/1998 | Hamer |
| 5,986,011 A | 11/1999 | Ellis |
| 6,294,249 B1 | 9/2001 | Hamer |
| 6,734,256 B1 | 5/2004 | Everaerts |
| 6,893,718 B2 | 5/2005 | Melancon |
| 7,255,920 B2 | 8/2007 | Everaerts |
| 7,393,901 B1 * | 7/2008 | Filiatrault et al. ............ 525/222 |
| 7,691,437 B2 | 4/2010 | Ellis |
| 7,968,661 B2 | 6/2011 | Ellis |
| 8,507,612 B2 * | 8/2013 | Zhu et al. .................... 525/329.9 |
| 2010/0227969 A1 | 9/2010 | Zhu |

FOREIGN PATENT DOCUMENTS

| | | |
|---|---|---|
| DE | 836353 | 4/1952 |
| DE | 753128 | 11/1952 |
| EP | 0265091 | 4/1988 |
| JP | 2004331775 | 11/2004 |

(Continued)

OTHER PUBLICATIONS

Babenkova, "New Reactive Oligomers and Monomers Derived from Ethylenimine", Journal of Applied Chemistry of the USSR, Aug. 1967, vol. 40, pp. 1715-1719. (Institute of Macromolecular Compounds, Academy of Sciences of the USSR. Translated from Zhurnal Prikladnoi Khimii, vol. 40, No. 8, pp. 1783-1788, Aug. 1967. Original article submitted Jul. 7, 1965.).

Baumert, "Carboxy-terminated homo- and copolymers of styrene using dicarboxylic acid-functional azo initiator and 2,2,6,6-tetramethyl-1-piperidyloxyl (TEMPO)", Macromolecular Rapid Communication, 1997, vol. 18, pp. 787-794.

Bestian, "Über einige Reaktionen des Äthylen-imins", Justus Liebigs Annalen der Chemie, Feb. 1950, vol. 566, No. 2, pp. 210-244.

Dufils, "Intermolecular Radical Addition of Alkoxyamines onto Olefins: An Easy Access to Advanced Macromolecular Architectures Precursors", Polymer, Aug. 24, 2007, vol. 48, No. 18, pp. 5219-5225.

(Continued)

*Primary Examiner* — Kara Boyle
(74) *Attorney, Agent, or Firm* — Jean A. Lown

(57) ABSTRACT

Grafted compounds are formed by reacting (1) a first compound having both an aziridinyl group and a polymeric group with (2) a second compound having at least one acidic group. This reaction results in the opening of the aziridinyl ring on the first compound by the acidic group on the second compound and the formation of an attachment group that connects polymeric group of the first compound to the second compound. In some embodiments, the second compound is a polymeric material having multiple acidic groups and the product of the reaction of the first compound with the second compound results in the formation of a grafted copolymer.

15 Claims, No Drawings

(56) References Cited

FOREIGN PATENT DOCUMENTS

| WO | WO 00/39233 | 7/2000 |
|----|----|----|
| WO | WO 2010/104645 | 9/2010 |
| WO | WO 2012/005932 | 1/2012 |

OTHER PUBLICATIONS

Kadorkina, "α,ω-Bis-N-Aziridinoalkanes", Bulletin of the Academy of Sciences of the USSR, Apr. 1991, vol. 40, pp. 780-783. [N. N. Semenov Institute of Chemical Physics, Academy of Sciences of the USSR, Moscow. Translated from Izvestiya Akademii Nauk SSSR, Seriya Khimicheskaya, No. 4, pp. 882-885, Apr. 1991. Original article submitted May 25, 1990 (4 pages).
Kobayashi, "Synthesis of Well-defined Polymers End-functionalized with Crosslinkable Aziridine Groups by Living Anionic Polymerization", Journal of Polymer Science: Part A: Polymer Chemistry, 2005, vol. 43, pp. 4126-4135.
Leenen, "Microwave-assisted Nitroxide-mediated Polymerization of Alkyl Acrylates", e-Polymers, 2005, No. 71, pp. 1-9.
Messerschmidt, "Synthesis of Partially Protected Block Copolymers Based on 4-Hydroxystyrene Using NMRP and a Sequence of Polymer Analogous Reactions", Macromolecules, Apr. 22, 2008, vol. 41, No. 8, pp. 2821-2831.
International Search Report for PCT/US2011/037157, 3 pages.

* cited by examiner

US 8,796,390 B2

GRAFTED COMPOUNDS FORMED FROM AZIRIDINYL-CONTAINING COMPOUNDS

TECHNICAL FIELD

Grafted compounds are described that are the reaction product of (1) a first compound having both an aziridinyl group and a polymeric group with (2) a second compound having an acidic group.

BACKGROUND

Different methods have been used to reinforce various acrylic polymers. For example, crosslinking the polymeric chains can impart greater shear strength and cohesive strength to the materials. This crosslinking can be chemical or physical. Chemical crosslinking can include the introduction of a monomer having multiple groups capable of undergoing polymerization reactions or multiple groups that react or interact with other groups on the polymeric chains. Physical crosslinking methods have included the introduction of another polymeric moiety that is linked to the main polymer chain but has the ability to phase separate from the main polymer and form its own domain within the polymeric material. When the polymeric material is an adhesive material, these phase separated polymeric moieties can be selected to have a higher glass transition temperature than the primary elastomeric polymer as described, for example, in U.S. Pat. Nos. 6,734,256 (Everaerts et al.), 7,255,920 (Everaerts et al.), and 5,057,366 (Husman et al.).

Bis-aziridine compounds have been used as chemical crosslinking agents in various polymer systems. Such compounds are described, for example, in U.S. Pat. No. 6,893,718 (Melancon et al.), German Patent No. 836,353 (Bestian), in an article of Bestian (*J. Lieb. Ann. Chem.*, 566, 210-244 (1950)), in an article of Babenkova (*J. of Applied Chemistry of the USSR*, 40, 1715-1719 (1967)), and in an article of Kadorkina et al. (*Bulletin of the Academy of Sciences of the USSR*, 40, 780-783 (1991)).

Some aziridinyl-terminated polymers have been prepared as described, for example, in an article of Kobayashi et al. (*Journal of Polymer Science: Part A: Polymer Chemistry*, 43, 4126-4135 (2005)), Japanese Patent Publication JP4294369B2 (Kobayashi et al.), and European Patent Publication EP0265091A1 (Hertier et al.).

SUMMARY

Grafted compounds are described that are the reaction product of (1) a first compound having both an aziridinyl group and a polymeric group with (2) a second compound having an acidic group. This reaction results in the opening of the aziridinyl ring of the first compound by the acidic group on the second compound and the accompanying attachment (i.e., grafting) of the polymeric group of the first compound to the second compound. Additionally, reaction mixtures and methods used to prepare the grafted compounds are described. In some embodiments, the second compound is a polymeric material having multiple acidic groups and the reaction product is a grafted copolymer.

In a first aspect, a reaction mixture is described. The reaction mixture includes (1) a first compound of Formula (I)

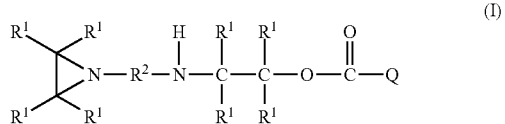

and (2) a second compound having at least one acidic group. In Formula (I), each $R^1$ is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a first monomer composition that includes at least one ethylenically unsaturated monomer.

In a second aspect, a grafted copolymer is described. The grafted copolymer is a product of a reaction mixture that includes (1) a first compound of Formula (I) as described above and (2) a second compound that is a polymeric material having at least one acidic group.

In a third aspect, a method of making a grafted copolymer is described. The method includes forming a reaction mixture that includes (1) a first compound of Formula (I) as described above and (2) a second compound that is a polymeric material having at least one acidic group. The method further includes reacting an aziridinyl group of the first compound with at least one acidic group of the second compound to form the grafted copolymer.

DETAILED DESCRIPTION

Grafted compounds are formed by reacting (1) a first compound having both an aziridinyl group and a polymeric group with (2) a second compound having at least one acidic group. This reaction results in the opening of the aziridinyl ring on the first compound by the acidic group on the second compound and the formation of an attachment group that connects (i.e., grafts) the polymeric group of the first compound to the second compound. In some embodiments, the second compound is a polymeric material having at least one acidic groups and the product of the reaction of the first compound with the second compound results in the formation of a grafted copolymer.

The term "a", "an", and "the" are used interchangeably with "at least one" to mean one or more of the elements being described.

The recitation of any numerical range by endpoints is meant to include the endpoints of the range, all numbers within the range, and any narrower range within the stated range.

The term "aziridinyl" refers to a monovalent three-member ring structure of formula

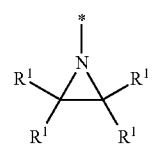

where each $R^1$ is independently hydrogen or an alkyl (e.g., an alkyl having 1 to 10 carbon atoms, 1 to 6 carbon atoms, or 1 to 3 carbon atoms). The asterisk shows the location where the aziridinyl group is attached to the rest of the compound.

As used herein, the terms "polymer" and "polymeric" refer to a material that is a homopolymer, copolymer, terpolymer, or the like. Likewise, the terms "polymerize" and "polymerization" refer to a process of making a homopolymer, copolymer, terpolymer, or the like. The terms "copolymer" and "copolymeric" can be used to refer to a polymer prepared using two or more different monomers.

The term "alkyl" refers to a monovalent group that is a radical of an alkane and includes groups that are linear, branched, cyclic, bicyclic, or a combination thereof. The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, ethylhexyl, and isobornyl.

The term "heteroalkyl" refers to a monovalent group is an alkyl group in which one or more —CH$_2$— groups are replaced with thio, oxy, or —NRa— where Ra is hydrogen or alkyl. The heteroalkyl can be linear, branched, cyclic, bicyclic, or a combination thereof and can include up to 60 carbon atoms and up to 40 heteroatoms. In some embodiments, the heteroalkylincludes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "alkylene" refers to a divalent group that is a radical of an alkane. The alkylene can be straight-chained, branched, cyclic, bicyclic, or a combination thereof. The alkylene typically has 1 to 30 carbon atoms. In some embodiments, the alkylene contains 1 to 20, 1 to 10, 1 to 6, or 1 to 4 carbon atoms. The radical centers of the alkylene can be on the same carbon atom (i.e., an alkylidene) or on different carbon atoms.

The term "heteroalkylene" refers to a divalent alkylene having one or more —CH$_2$— groups replaced with a thio, oxy, or —NR$^a$— where R$^a$ is hydrogen or alkyl. The heteroalkylene can be linear, branched, cyclic, bicyclic, or a combination thereof and can include up to 60 carbon atoms and up to 40 heteroatoms. In some embodiments, the heteroalkylene includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "aryl" refers to a monovalent group that is aromatic and carbocyclic. The aryl can have one to five rings that are connected to or fused to the aromatic ring. At least one ring is aromatic and any other ring can be aromatic, non-aromatic, or a combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or a combination thereof. At least one ring is aromatic and any other ring can be aromatic, non-aromatic, or a combination thereof. In some embodiments, the arylene group has up to 5 rings, up to 4 rings, up to 3 rings, up to 2 rings, or one aromatic ring. For example, the arylene group can be phenylene, biphenylene, terphenylene, fluorenylene, or naphthalene.

The term "heteroarylene" refers to a divalent group that is aromatic and heterocyclic. That is, the heteroarylene includes at least one heteroatom in an aromatic ring having 5 or 6 members. Suitable heteroatoms are typically oxy, thio, or —NR$^3$— where R$^3$ is hydrogen or an alkyl. The group can have one to five rings that are connected, fused, or a combination thereof. At least one ring is heteroaromatic and any other ring can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

The term "alkoxy" refers to a monovalent group of formula —OR where R is an alkyl group.

The term "aralkyl" refers to a monovalent group that is an alkyl group substituted with an aryl group.

The term "aryloxy" refers to a monovalent group of formula —OAr where Ar is an ayrl group.

The term "aryloxyalkyl" refers to a monovalent group that is an alkyl substituted with an aryloxy group.

The term "carbonyl" refers to a divalent group of formula —(CO)— where the carbon is attached to the oxygen with a double bond.

The term "carbonyloxy" are used interchangeably to refer to a divalent group of formula —(CO)O—. The term "carboxyl" refers to the group —(CO)OH and/or the salt thereof.

The term "carbonylimino" refers to a divalent group of formula —(CO)NR$^b$— where R$^b$ is hydrogen, alkyl, aryl, aralkyl, acyl, alkylsulfonyl, or arylsulfonyl.

The term "oxy" refers to a divalent group —O—.

The term "(meth)acrylic acid" refers to both acrylic acid and methacrylic acid. Likewise, the term "(meth)acrylate" refers to both an acrylate (i.e., acrylate ester) and a methacrylate (i.e., methacrylate ester) and the term "(meth)acrylamide" refers to both an acrylamide and a methacrylamide.

The grafted compounds are formed from a reaction mixture that includes a first compound of Formula (I)

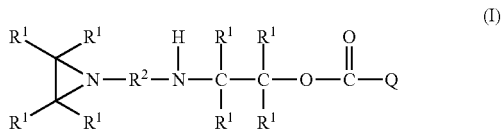

plus a second compound having at least one acid group. In Formula (I), each R$^1$ is independently hydrogen or an alkyl. The R$^2$ group is a divalent group containing an alkylene, heteroalkylene, arylene, heteroarylene, or a combination thereof. Group R$^2$ can optionally further include an oxy, carbonyl, carbonyloxy, carbonylimino, —NR$^3$—, or a combination thereof. Group R$^3$ is hydrogen or an alkyl (e.g., an alkyl having 1 to 10 carbon atoms, 1 to 6 carbon atoms, 1 to 4 carbon atoms, or 1 to 3 carbon atoms). Group Q is a polymeric group that is a polymerized product of a first monomer composition that includes at least one ethylenically unsaturated monomer.

Suitable alkyl groups for R$^1$ typically have 1 to 10 carbon atoms, 1 to 6 carbon atoms, 1 to 4 carbon atoms, or 1 to 3 carbon atoms. In many embodiments, the azirdinyl group has at least one R$^1$ group that is hydrogen and at least one R$^1$ group that is an alkyl. In some more specific embodiments, one of the R$^1$ groups on the azridinyl ring is methyl with the remaining R$^1$ groups being hydrogen.

The divalent group R$^2$ contains at least one alkylene, heteroalkylene, arylene, heteroarylene, or a combination thereof. In addition to at least one of these groups, R$^2$ can further include an oxy, carbonyl, carbonyloxy, carbonylimino, —NR$^3$—, or a combination thereof. That is, in some embodiments, R$^2$ is an alkylene, a heteroalkylene, an arylene, a heteroarylene, or a combination thereof. In other embodiments, R$^2$ includes (a) at least one alkylene, heteroalkylene, arylene, heteroarylene, or a combination thereof plus (b) at least one oxy, carbonyl, carbonyloxy, carbonylimino, —NR$^3$—, or a combination thereof. The oxy, carbonyl, carbonyloxy, carbonylimino, —NR³— or a combination thereof can be used, for example, (1) to link together two or more groups selected from alkylene, heteroalkylene, arylene, and heteroarylene, (2) to attach an alkylene, heteroalkylene, arylene, or heteroarylene to the aziridinyl group, to the polymeric group, or to both the aziridinyl group and the polymeric group, or (3) both (1) and (2).

In some embodiments, R² includes a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —NR³—, or a combination thereof. The second group can be further connected to a third group that is an alkylene, heteroalkylene, arylene, or heteroarylene using a second linking group that is an oxy, carbonyl, carbonyloxy, carbonylimino, —NR³— or combination thereof. The third group can be further connected to a fourth group that is an alkylene, heteroalkylene, arylene, or heteroarylene using a third linking group that is an oxy, carbonyl, carbonyloxy, carbonylimino, —NR³—, or a combination thereof. Additional groups selected from an alkylene, heteroalkylene, arylene, and heteroarylene can be further connected using additional linking groups selected from an oxy, carbonyl, carbonyloxy, carbonylimino, —NR³—, or a combination thereof.

In other embodiments, R² includes a first group that is an alkylene, heteroalkylene, arylene, or heteroarylene that is positioned between two groups that are each selected from an oxy, carbonyl, carbonyloxy, carbonylimino, —NR³—, or a combination thereof. One of these groups is attached the polymeric group and the other is attached to the aziridinyl group. These two groups are typically the same but can be different.

In still other embodiments, two or more alkylene, heteroalkylene, arylene, or heteroarylene groups are positioned between two groups selected from oxy, carbonyl, carbonyloxy, carbonylimino, —NR³—, or a combination thereof. One of these groups is attached the polymeric group and the other is attached to the aziridinyl group. These two groups are typically the same but can be different. The two or more alkylene, heteroalkylene, arylene, or heteroarylene groups are typically connected to each other through an oxy, carbonyl, carbonyloxy, carbonylimino, —NR³— group, or a combination thereof.

Some compounds of Formula (I) are also compounds of Formula (Ia).

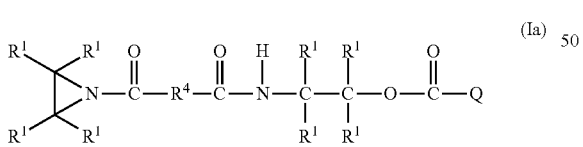

The group R² from Formula (I) is equal to —(CO)—R⁴—(CO)— in Formula (Ia). Group R⁴ is a divalent group that includes an alkylene, heteroalkylene, arylene, heteroarylene, or a combination thereof. Optionally, group R⁴ can further include an oxy, carbonyl, carbonyloxy, carbonylimino, —NR³—, or a combination thereof. Stated differently, in some embodiments, R⁴ is an alkylene, a heteroalkylene, an arylene, a heteroarylene, or a combination thereof. In other embodiments, R⁴ includes (a) at least one alkylene, heteroalkylene, arylene, heteroarylene, or a combination thereof plus (b) at least one oxy, carbonyl, carbonyloxy, carbonylimino, —NR³—, or a combination thereof.

As with the R² group in Formula (I), the R⁴ group in Formula (Ia) can include a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —NR³—, or a combination thereof. The second group can be further connected to a third group that is an alkylene, heteroalkylene, arylene, or heteroarylene using a second linking group that is an oxy, carbonyl, carbonyloxy, carbonylimino, —NR³—, or a combination thereof. The third group can be further connected to a fourth group that is an alkylene, heteroalkylene, arylene, or heteroarylene using a third linking group that is an oxy, carbonyl, carbonyloxy, carbonylimino, —NR³—, or a combination thereof. Additional groups selected from an alkylene, heteroalkylene, arylene, and heteroarylene can be further connected using additional linking groups selected from an oxy, carbonyl, carbonyloxy, carbonylimino, —NR³—, or a combination thereof.

In some embodiments, the group R⁴ in Formula (Ia) is an alkylene, heteroalkylene, arylene, or heteroarylene. Exemplary alkylene groups have 1 to 30 carbon atoms, 1 to 20 carbon atoms, 1 to 12 carbon atoms, 1 to 6 carbon atoms, or 1 to 4 carbon atoms. Exemplary heteroalkylene groups have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms. Exemplary arylene groups include, but are not limited to, phenylene (e.g., meta-phenylene or para-phenylene) and biphenylene. Exemplary heteroarylenes include, but are not limited to, triazine-diyl, pyridine-diyl, pyrimidine-diyl, and pyridazine-diyl.

Some more specific compounds according to Formula (Ia) are of Formula (Ib) where R⁴ is an arylene.

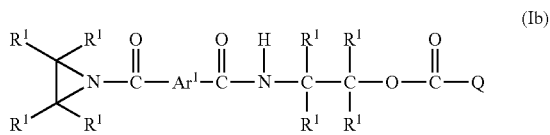

In some more specific compounds of Formula (Ib), the arylene is phenylene such as in Formula (Ic).

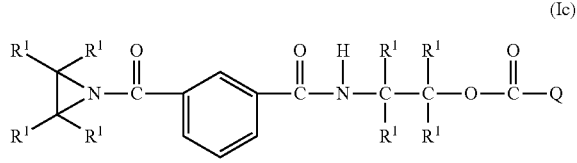

Other example compounds of Formula (Ia) are of Formula (Id).

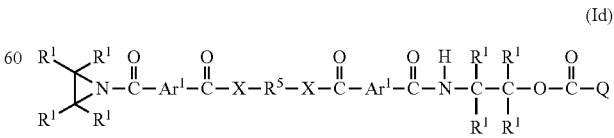

In Formula (Id), the divalent group —Ar¹—(CO)—X—R⁵—X—(CO)—Ar¹— is equal to R⁴ in Formula (Ia) and the divalent group —(CO)—Ar¹—(CO)—X—R⁵—X—(CO)—

$Ar^1$—(CO)— is equal to $R^2$ in Formula (I). Each group $Ar^1$ is an arylene and each group X is oxy or —$NR^3$—. Group $R^5$ is a divalent group that includes an alkylene or heteroalkylene, arylene, heteroarylene, or a combination thereof and that can further include an oxy, carbonyl, carbonyloxy, carbonylimino, —$NR^3$—, or a combination thereof. Stated differently, in some embodiments, $R^5$ is an alkylene, a heteroalkylene, an arylene, a heteroarylene, or a combination thereof. In other embodiments, $R^5$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof.

As with both $R^2$ and $R^4$, group $R^5$ can include a first group that is an alkylene, heteroalkylene, arylene, or heteroarylene connected to a second group that is an alkylene, heteroalkylene, arylene, or heteroarylene using a first linking group that is an oxy, carbonyl, carbonyloxy, carbonylimino, —$NR^3$—, or a combination thereof. The second group can be further connected to a third group that is an alkylene, heteroalkylene, arylene, or heteroarylene using a second linking group that is an oxy, carbonyl, carbonyloxy, carbonylimino, —$NR^3$—, or a combination thereof. The third group can be further connected to a fourth group that is an alkylene, heteroalkylene, arylene, or heteroarylene using a third linking group that is an oxy, carbonyl, carbonyloxy, carbonylimino, —$NR^3$—, or a combination thereof. Additional groups selected from an alkylene, heteroalkylene, arylene, and heteroarylene can be further connected using additional linking groups selected from an oxy, carbonyl, carbonyloxy, carbonylimino, —$NR^3$—, or a combination thereof.

In some compounds of Formula (Id), each $Ar^1$ is phenylene such as in Formula (Ie)

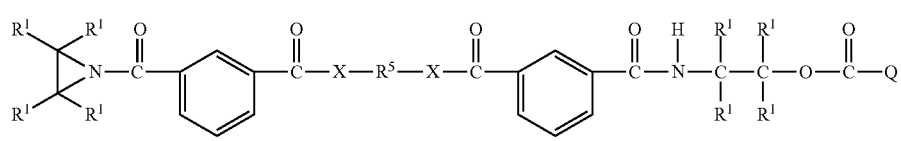

(Ie)

The groups $R^1$, X, $R^5$, and Q are the same as defined above for Formula (Id).

In some specific embodiments of Formula (Ie), the $R^5$ group is an alkylene or heteroalkylene. Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

Other example compounds of Formula (Ia) are of (If).

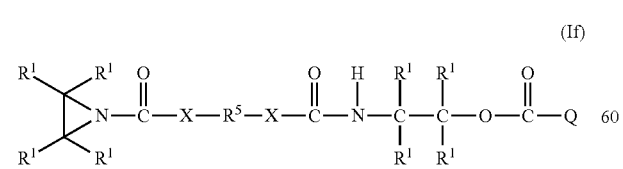

(If)

In Formula (If), the group —X—$R^5$—X— is equal to $R^4$ in Formula (Ia) and the group —(CO)—X—$R^5$—X—(CO)— is equal to $R^2$ in Formula (I). The groups X and $R^5$ are the same as defined above for Formula (Id). In some specific embodiments of Formula (If), each X is oxy or —$NR^3$— with the group $R^5$ being an alkylene or heteroalkylene.

Yet other example compounds of Formula (I) are of Formula (Ig).

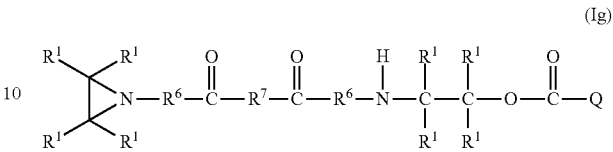

(Ig)

In Formula (Ig), the divalent group —$R^6$—(CO)—$R^7$—(CO)—$R^6$— is equal to group $R^2$ in Formula (I). Each $R^6$ is independently an alkylene having 1 to 10 carbon atoms, 1 to 6 carbon atoms, 1 to 4 carbon atoms, or 1 to 3 carbon atoms. Group $R^7$ is a divalent group that includes an alkylene, heteroalkylene, arylene, heteroarylene, or a combination thereof and that can further include an oxy, carbonyl, carbonyloxy, carbonylimino, —$NR^3$—, or a combination thereof. Stated differently, in some embodiments, $R^7$ is an alkylene, a heteroalkylene, an arylene, a heteroarylene, or a combination thereof. In other embodiments, $R^7$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof.

As with $R^2$, $R^4$, or $R^5$, group $R^7$ can include a first group that is an alkylene, heteroalkylene, arylene, or heteroarylene connected to a second group that is an alkyene, heteroalkylene, arylene, or heteroarylene using a first linking group that is an oxy, carbonyl, carbonyloxy, carbonylimino, —$NR^3$—, or a combination thereof. The second group can be further connected to a third group that is an alkylene, heteroalkylene, arylene, or heteroarylene using a second linking group that is an oxy, carbonyl, carbonyloxy, carbonylimino, —$NR^3$—, or a combination thereof. The third group can be further connected to a fourth group that is an alkylene, heteroalkylene, arylene, or heteroarylene using a third linking group that is an oxy, carbonyl, carbonyloxy, carbonylimino, —$NR^3$—, or a combination thereof. Additional groups selected from an alkylene, heteroalkylene, arylene, and heteroarylene can be further connected using additional linking groups selected from an oxy, carbonyl, carbonyloxy, carbonylimino, —$NR^3$—, or a combination thereof.

Some compounds of Formula (Ig) are compounds of Formula (Ih).

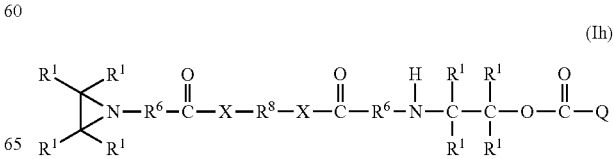

(Ih)

In Formula (Ih), the divalent group —X—R$^8$—X— is equal to the group R$^7$ in Formula (Ig). Each group X is independently oxy or —NR$^3$—. Group R$^8$ is a divalent group that includes an alkylene, heteroalkylene, arylene, heteroarylene, or a combination thereof and that can further include an oxy, carbonyl, carbonyloxy, carbonylimino, —NR$^3$—, or a combination thereof. Stated differently, in some embodiments, R$^8$ is an alkylene, heteroalkylene, arylene, heteroarylene, or a combination thereof. In other embodiments, R$^8$ includes (a) at least one alkylene, heteroalkylene, arylene, heteroarylene, or a combination thereof plus (b) at least one oxy, carbonyl, carbonyloxy, carbonylimino, —NR$^3$—, or a combination thereof.

Group R$^8$ is an alkylene or heteroalkylene group and X is an oxy in some specific embodiments of Formula (Ih). Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

All of the compounds of Formula (I) and (Ia) to (Ih) have a group Q, which is a polymeric group that is a polymerized product of a first monomer composition that includes at least one ethylenically unsaturated monomer. The polymerization reaction can be a free radical polymerization reaction or an anionic polymerization reaction.

Any suitable ethylenically unsaturated monomer can be used to form polymeric group Q (i.e., first polymeric group Q). Suitable monomers include, but are not limited to, various (meth)acrylates (i.e., various (meth)acrylate esters), (meth)acrylic acids, (meth)acrylamides, vinyls, or the like. In some embodiments, Q is a homopolymeric group in which all of the monomers used to form the polymeric group are the same. In other embodiments, Q is a random copolymer or a block copolymer.

In some embodiments, the polymeric group Q of the compound of Formula (I) is formed from one or more (meth)acrylates. The (meth)acrylates are often In Formula (II).

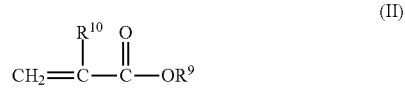

(II)

In this formula, group R$^{10}$ is hydrogen or methyl and group R$^9$ is an alkyl, heteroalkyl, aryl, aralkyl, or aryloxyalkyl. Suitable alkyl groups often have 1 to 20 carbon atoms, 1 to 10 carbon atoms, 1 to 6 carbon atoms, or 1 to 4 carbon atoms. Suitable heteroalkyl groups often have 2 to 30 carbon atoms and 1 to 16 heteroatoms, 2 to 20 carbon atoms and 1 to 12 carbon atoms, 2 to 10 carbon atoms and 1 to 6 heteroatoms, or 2 to 6 carbon atoms and 1 to 4 heteroatoms. The alkyl and heteroalkyl groups can be linear, branched, cyclic, bicyclic, or a combination thereof. Suitable aralkyl groups often have 7 to 18 carbon atoms. An example is an alkyl group substituted with phenyl. Suitable aryloxyalkyl groups often have 7 to 18 carbon atoms. An example is an alkyl group substituted with an oxyphenyl. These monomers, when formed into a homopolymer, can have a wide range of glass transition temperatures.

The monomers can be selected that provide a desired glass transition temperature depending on a particular use of the compound of Formula (I). More specifically, polymeric Q groups with a glass transition temperature that is greater than or equal to 20° C. or higher tend to be thermoplastic. As used herein, the term "thermoplastic" refers to a polymeric material that flows when heated and then return to its original state when cooled to room temperature. The polymeric groups with a glass transition temperature that is less than 20° C. tend to be elastomeric. As used herein, the term "elastomeric" refers to a polymeric material that can be stretched to at least twice its original length and then retracted to approximately its original length upon release.

In some embodiments, the monomers of Formula (II) used to form the polymeric group Q are selected from (meth)acrylates such as n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methylbutyl acrylate, 4-methyl-2-pentyl acrylate, n-octyl acrylate, n-propyl acrylate, and n-octyl methacrylate. These monomers, when formed into a homopolymeric group, tend to have a glass transition temperature less than 20° C., less than 10° C., or less than 0° C.

In other embodiments, the monomers of Formula (II) used to form the polymeric group Q are selected from (meth)acrylates (i.e., (meth)acrylate esters) such as methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxylethyl(meth)acrylate, dicyclopentanyl (meth)acrylate, and 3,3,5 trimethylcyclohexyl(meth)acrylate. These monomers, when formed into a homopolymeric group, tend to have a glass transition temperature that is equal to at least 20° C., at least 30° C., at least 40° C., or at least 50° C.

Any of the (meth)acrylate monomers can be optionally substituted with a group such as an amino group, hydroxyl group, or epoxy group. The substituents tend to enhance the polarity of the monomers. Examples of (meth)acrylates with a hydroxyl substituent include, but are not limited to, 2-hydroxyethyl(meth)acrylate, 2-hydroxypropyl(meth)acrylate, and 4-hydroxybutyl(meth)acrylate. Examples (meth)acrylates with an epoxy substituent include, but are not limited to, glycidyl(meth)acrylate. Examples of (meth)acrylates with an amino group include, but are not limited to, N,N-dialkyl (meth)acrylates such as dimethylaminoethyl(meth)acrylate.

The (meth)acrylates can also be an alkoxyalkyl(meth)acrylate or poly(alkoxyalkyl(meth)acrylate) such as, for example, 2-(2-ethoxyethoxy)ethyl(meth)acrylate, 2-ethoxyethyl (meth)acrylate, 2-methoxyethoxyethyl(meth)acrylate, 2-methoxyethyl(meth)acrylate, and polyethylene glycol mono(meth)acrylates. These tend to be polar molecules.

The polymeric group Q is typically prepared from non-acidic monomers. If group Q is prepared from a mixture of monomers, at least 90 weight percent, at least 95 weight percent, at least 97 weight percent, at least 98 weight percent, or at least 99 weight percent of the monomers do not have an acidic group (i.e., the monomers are free of acidic groups) such as carboxyl group. In some embodiments, all of the monomers in the first monomer composition are free of acidic groups. If the content of acidic monomers used to form polymeric group Q is too great, it can be difficult to prepare a compound of Formula (I) with a single aziridinyl group.

Some specific Q groups are prepared from (meth)acrylates such as, for example, poly(benzyl methacrylate), poly(methyl methacrylate), poly(phenoxyethyl acrylate), and random or block poly(isobornyl acrylate-co-benzyl methacrylate).

Other suitable ethylenically unsaturated monomers for forming polymeric group Q are (meth)acrylamide, alkyl acrylamides such as t-butyl acrylamide, monoalkylaminoalkyl acrylamides such as methylaminoethyl acrylamide, dialkylaminoalkylacrylamides such as dimethylaminoethylacrylamide, and the like.

Still other suitable ethylenically unsaturated monomers that can be used to form polymeric group Q are various vinyl monomers such as, vinyl ether monomers, vinyl aryl monomers, vinyl heterocyclic monomers, vinyl ester monomers, and the like. Suitable vinyl ether monomers include, for example, vinyl methyl ether. Suitable vinyl aryl monomers include, but are not limited to, styrene, alpha-methyl styrene, alkyl substituted sytrenes (e.g., vinyl toluene, dimethylstytrene, ethylstyrene, isopropylstyrene, and tert-butylstyrene), and the like. Any of these vinyl aryl monomers optionally can be substituted with one or more groups selected from amino, hydroxyl, alkoxy, halo, and the like. Suitable vinyl heterocyclic monomers include, but are not limited to, 2-vinyl pyridine, 4-vinyl pyridine, and n-vinylcarpolactam. Suitable vinyl esters include, but are not limited to, vinyl acetate and vinyl proprionate. Monomers such as vinyl aryl monomers, vinyl heterocyclic monomers, and some vinyl ester monomers, when formed into a homopolymeric group, tend to have a glass transition temperature that is at least 20° C., at least 30° C., at least 40° C., or at least 50° C.

Some specific Q polymeric groups are prepared from vinyl monomers such as a vinyl aryl monomer, vinyl heterocyclic monomer, or a combination thereof. These Q groups can be homopolymers, random copolymers, or block copolymers. The block copolymers can have two or more blocks. Some block copolymers have a first block of poly(vinyl aryl monomer) and a second block of poly(vinyl heterocylic monomer). Some specific polymeric examples are poly(styrene), random poly(styrene-co-vinyl pyridine), and di-block poly(styrene-co-vinyl pyridine).

The polymeric group Q can have any suitable molecular weight. In many embodiments, the weight average molecular weight (Mw) is greater than the 5,000 grams/mole (i.e., 5,000 Daltons). For example, the weight average molecular weight can be greater than 7,500 grams/mole, greater than 10,000 grams/mole, greater than 12,000 grams/mole, greater than 15,000 grams/mole, or greater than 20,000 grams/mole. The weight average molecular weight is often up to 150,000 grams/mole, up to 120,000 grams/mole, up to 100,000 grams/mole, up to 80,000 grams/mole, up to 60,000 grams/mole, or up to 40,000 grams/mole. If the molecular weight is too great, the resulting compound of Formula (I) can have an unacceptably low concentration of the aziridinyl group based on the weight of the first compound. That is, the weight percent of the compound attributable to the aziridinyl group may be unacceptably low compared to the weight percent of the first compound attributable to the polymeric group.

Although the polymeric group Q can be formed by either anionic polymerization or free radical polymerization, free radical polymerization techniques are often used. The polymerization reaction typically occurs in the presence of an initiator. Although any known initiator can be used, the initiator is often an azo compound. Suitable azo compounds include, but are not limited to, 2,2'-azobis(isobutyronitrile) commercially available under the trade designation VAZO 64 from DuPont (Wilmington, Del.), 2,2'-azobis(2-methylbutyronitrile) commercially available under the trade designation VAZO 67 from DuPont, 2,2'-azobis(2,4-dimethylpentanenitrile) commercially available under the trade designation VAZO 52 from DuPont, and 4,4'-azobis(4-cyanovaleric acid). The use of a carboxyl-containing initiator such as 4,4'-azobis(4-cyanovaleric acid) is often preferred because such an initiator tends to increase the likelihood that the polymeric intermediate (Q-(CO)—OH) involved in the preparation of the compounds of Formula (I) has a carboxyl group. The initiator is typically added in an amount in the range of 0.01 to 5 weight percent, in the range of 0.05 to 3 weight percent, in the range of 0.05 to 2 weight percent, in the range of 0.05 to 1 weight percent, or in the range of 0.1 to 1 weight percent based on the weight of monomers in the monomer composition. The amount of initiator can be used to control the weight average molecular weight of the polymeric group Q. More polymeric chains are formed when greater amounts of the initiator are used. This leads to polymeric chains with a lower weight average molecular weight. Conversely, fewer polymeric chains with a higher weight average molecular weight are formed with smaller amounts of initiator.

The monomer composition used to form the polymeric group Q can also include a chain transfer agent to control the molecular weight. Examples of useful chain transfer agents include, but are not limited to, carbon tetrabromide, alcohols, mercaptans, and mixtures thereof. The use of carboxyl-containing chain transfer agents such as, for example, 3-mercaptopropionic acid is often preferred. These carboxyl-containing chain transfer agent tend to increase the likelihood that the polymeric intermediate involved in the preparation of the compounds of Formula (I) has a carboxyl group.

Chain transfer agents can be used with most ethylenically unsaturated monomers. When a chain transfer agent is used, one end of the polymeric material is often a group derived from the initiator while the other end can be a group derived from the chain transfer agent. At least one of the initiator or chain transfer agent can be selected to provide acidic functionality (e.g., a carboxyl group). Using both an initiator and a chain transfer agent that include an acidic functionality tends to increase the likelihood that most polymeric chains will contain an acidic functionality.

Instead of a chain transfer agent, the monomer composition can include a nitroxide mediating agent such as, for example, 2,2,6,6-tetramethyl-1-piperidinyloxy (TEMPO) commercially available from Alfa Aesar (Ward Hill, Mass.), 1,1,3,3-tetraethyl-2,3-dihydro-1H-isoindolin-2-yloxyl, di-tert-butyl nitroxide, or 4-oxo-TEMPO commercially available from Alfa Aesar. The polymerization reaction is considered to be "living" or "controlled" and can be initiated and terminated as desired. The mechanism of control relies on the reversible coupling of the nitroxide mediating agent to the free radical on the active (i.e., propagating) polymer chain to form an alkoxy amine linkage. The addition of the nitroxide mediating agent makes the polymer chain dormant and unable to further propagate. At certain temperatures, however, the alkoxy amine linkage can be cleaved allowing the polymer chain to become active and continue to grow. Thus, equilibrium between active and dormant polymer chains can be controlled though the selection of the temperature range that is used for polymerization. The temperature range is typically in the range of 100° C. to 160° C. The resulting polymeric material tends to have a relatively narrow molecular weight distribution.

Nitroxide mediating agents are often used in the polymerization of monomers such as styrene. When a nitroxide compound is used, one end of the polymeric material is often a group derived from the initiator and the other end can be the nitroxide compound. At least one of these is typically selected to provide acid functionality (e.g., a carboxyl group). For example, if the initiator is 4,4'-azobis(4-cyanovaleric acid) and the nitroxide mediating agent TEMPO are used, one end of the polymer is usually the group —NH—C(CN)(CH$_3$)—CH$_2$—CH$_2$—COOH. In this example, the carboxyl group is provided by the initiator.

In some cases the nitroxide mediating agent and the initiating species can be obtained from one compound. For example, some alkoxyamine compounds can decompose at a particular temperature to yield both an initiating radical and a nitroxide radical. Such an initiator is described in an article by Messerschmidt et al. (*Macromolecules*, 41 (2008)). The initiating species from the decomposed alkoxyamine also may have a carboxyl group, leaving the generated polymeric group with a carboxyl group at one end of the chain. The other end of the chain is capped with the nitroxide portion of the decomposed alkoxyamine compound. One such compound described in articles by Leenen et al. (e-Polymers, number 71 (2005)) and Dufils et al. (*Polymer*, 48 (2007)), is 2-methyl-2-(N-tert-butyl-N-(1' diethylphosphono-2,2'-dimethylpropyl) aminoxyl)propanoic acid.

As used herein, the term "polydispersity" or "polydispersity index" is a measure of the molecular weight distribution and refers to the weight average molecular weight (Mw) divided by the number average molecular weight (Mn) of the polymer. Polymeric materials that are all of the same molecular weight have a polydispersity of 1.0 while polymeric materials that have more than one molecular weight have a polydispersity greater than 1.0. The polydispersity can be determined, for example, using gel permeation chromatography. The polydispersity index is typically less than 10.0, less than 5.0, less than 2.0, less than 1.5, less than 1.4, less than 1.3, less than 1.2, or less than 1.1. When a nitroxide mediating agent is used, the polydispersity index is often in the range of 1.0 to 1.4, in the range of 1.0 to 1.3, or in the range of 1.0 to 1.2. If a non-living polymerization method is used such as when a traditional chain transfer agent is used in place of a nitroxide mediated agent, the polydispersity index is often in the range of 1.5 to 10.0, in the range of 1.5 to 6.0, in the range of 1.5 to 4, in the range of 1.5 to 2.0, in the range of 1.5 to 2.0, or in the range of 1.6 to 2.0.

The compounds of Formula (I) can be formed as shown in Reaction Scheme A.

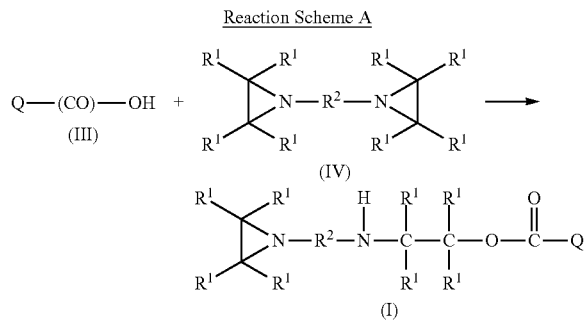

In Reaction Scheme A, the compound of Formula (III) is the carboxyl-terminated polymer. Group Q is a polymeric group that includes a polymerized product of a first monomer composition that includes at least one ethylenically unsaturated monomer. Group Q is often prepared by free radical polymerization methods or anionic polymerization methods. The compound of Formula (IV) is a bis-aziridine compound. The polymeric group Q in Formula (III) and the groups R$^1$ and R$^2$ in Formula (IV) as the same as defined above for Formula (I).

The compound of Formula (III) typically has only one carboxyl group. That is the polymeric group Q usually does not contain a carboxyl group or only a small amount of carboxyl groups. Multiple carboxyl groups in polymeric group Q tend to result in the formation of chemical crosslinks when reacted with the bis-aziridine compound of Formula (IV). However, if the concentration of carboxyl groups is sufficiently low, the likelihood of reaction of these groups with the bis-aziridine compound can be minimized. That is, low levels of carboxyl groups in group Q can be used.

Reaction Scheme A typically uses a molar excess of aziridinyl groups in the bis-aziridine compound of Formula (IV) to acidic groups in the compound of Formula (III). The number of moles of aziridinyl groups is often at least 2 times, at least 2.5 times, at least 3 times, at least 3.5 times, or at least 4 times the number of moles of acidic groups. This excess tends to minimize the reaction of both of the aziridinyl groups in the bis-aziridine compound with the carboxyl-terminated polymer of Formula (III). The reaction results in the ring opening of one but not both of the aziridinyl rings. The desired product of Formula (I) has an aziridinyl group that has not been ring opened by reaction with the carboxyl-terminated polymer of Formula (III).

Reaction Scheme A typically can occur at room temperature in the presence of a solvent that is miscible with the polymers of Formula (III) and the bis-aziridine compounds of Formula (IV). Suitable solvents for preparation of the compound of Formula (I) include, but are not limited to, toluene, xylenes, ethyl acetate, and methyl ethyl ketone. The resulting aziridinyl-terminated polymer of Formula (I) is then precipitated by the addition of a large amount of solvent that is immiscible with the aziridinyl-terminated polymer. The volume of solvent is often at least 5 times, at least 6 times, at least 8 times, or at least 10 times the volume of the product solution. Suitable solvents for the precipitation of the product (i.e., compounds of Formula (I)) include, but are not limited to, methanol. The precipitated polymeric material can then be filtered and dried. The percent yield is often greater than 85 percent, greater than 90 percent, greater than 92 percent, or greater than 95 percent.

Reaction Scheme A provides a flexible method for preparing the compounds of Formula (I). More specifically, the formation of the intermediate carboxyl-containing compound Q-(CO)OH using a free radical polymerization reaction allows great flexibility in the selection of monomers used to form the polymeric group Q.

Once formed, the first compound of Formula (I) can be reacted with a second compound that has an acidic group. Such a reaction results in the formation of an attachment group that grafts the first polymeric group Q to the second compound. The attachment group results from the reaction of the aziridinyl group of the first compound of Formula (I) with the acidic group on the second compound.

Reaction Scheme B is an example of one such reaction. In this reaction scheme, the compound of Formula (I) is reacted with a carboxyl-containing compound G-(CO)OH to form a grafted compound of Formula (VI). In this reaction scheme, the acidic groups on the second compound are carboxyl groups. The group G in Formulas (V) and (VI) can be any suitable organic group and is often a polymeric group.

Reaction Scheme B

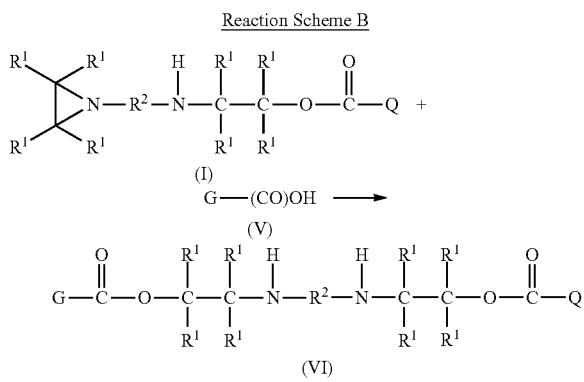

Although the carboxyl-containing compound G-(CO)OH of Formula (V) is shown in this reaction scheme with only one carboxyl group for ease of explanation, this compound can have any suitable number of carboxyl groups. That is, the final product can include multiple groups of formula —(CO)OC$(R^1)_2$C$(R^1)_2$NH—$R^2$—NH—C$(R^1)_2$C$(R^1)_2$—O(CO)-Q. If the second compound has multiple carboxyl groups, all or any fraction of these carboxyl groups can react with the compound of Formula (I).

In some embodiments, the second compound is a polymeric material (i.e., second polymeric material) having hat least one acidic group. The second compound often has multiple acidic groups. The product of the reaction is a grafted copolymer with the second compound being the backbone of the grafted copolymer and with the polymeric groups from the first compound being pendant groups. If the acidic groups are carboxyl groups, the grafted copolymer can have one or more groups of formula —(CO)OC$(R^1)_2$C$(R^1)_2$NH—$R^2$—NH—C$(R^1)_2$C$(R^1)_2$—O(CO)-Q where $R^1$, $R^2$, and Q are the same as defined above.

Any polymeric material having at least one acidic group can be used as the second polymeric material. Preferably, the second polymeric material has multiple acidic groups. Some suitable second polymeric materials are formed by polymerization of a second monomer composition that includes an acidic monomer. Suitable acidic monomers typically have an ethylenically unsaturated group plus an acidic group or a salt of an acidic group. The acidic monomer can be, for example, an ethylenically unsaturated carboxylic acid (i.e., the acidic group is a —COOH group), an ethylenically unsaturated phosphonic acid (i.e., the acidic group is a —PO$_3$H$_2$ group), an ethylenically unsaturated sulfonic acid (i.e, the acidic group is a —SO$_3$H group), or a salt thereof. Multiple acidic monomers can be used. If multiple acidic monomers are used, they can have the same or different acidic groups.

Example acidic monomers include, but are not limited to, (meth)acrylic acid, itaconic acid, fumaric acid, crotonic acid, citraconic acid, maleic acid, oleic acid, β-carboxyethyl acrylate, 2-acrylamidoethanesulfonic acid, 2-acrylamido-2-methylpropane sulfonic acid, 2-methacrylamido-2-methylpropane sulfonic acid, 2-sulfoethyl methacrylate, styrene sulfonic acid, vinylsulfonic acid, vinylphosphonic acid, and the like. If the acidic monomer is in the form of a salt, the cation of the salt can be an alkaline metal (e.g., sodium, potassium, or lithium ion), an ion of an alkaline earth (e.g., calcium, magnesium, or strontium ion), an ammonium ion, an ammonium ion substituted with one or more alkyl groups, an ammonium ion substituted with one or more aryl groups, or an ammonium ion substituted by one or more aryl groups and one or more alkyl groups. In many embodiments, the acidic monomer is an ethylenically unsaturated carboxylic acid (i.e., the acid group is a carboxyl group).

In some examples, the second polymeric material is a homopolymer of the acidic monomer. For example, the second polymeric material can be a poly((meth)acrylic acid). In other examples, the second polymeric material is a copolymer formed from a second monomer composition that includes an acidic monomer plus at least one other ethylenically unsaturated monomer. Any of the ethylenically unsaturated monomers described above as suitable monomers for the formation of polymeric group Q in Formula (I) can be used in the second monomer composition.

Some more specific second polymeric materials can be formed, for example, from a second monomer composition that includes (a) a (meth)acrylic acid and (b) at least one (meth)acrylate (i.e., (meth)acrylate ester). The (meth)acrylate ester monomer is the reaction product of a (meth)acrylic acid with a non-tertiary alcohol. The non-tertiary alcohol typically has 1 to 20 carbon atoms, 1 to 18 carbon atoms, 3 to 18 carbon atoms, 1 to 14 carbon atoms, 1 to 12 carbon atoms, 2 to 12 carbon atoms, 3 to 12 carbon atoms, or 4 to 12 carbon atoms. The alcohol, which is typically aliphatic and not aromatic, can be of formula $R^{11}$OH where $R^{11}$ is an alkyl group (including a linear alkyl group, cycloalkyl group or bicycloalkyl group), alkenyl group, aryl group, or aralkyl group. Suitable examples of non-tertiary alcohols include, but are not limited to, methanol, ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, cyclohexanol, 2-methyl-1-pentanol, 3-methyl-1-pentanol, 4-methyl-2-pentanol, 2-ethyl-1-butanol, 3,5,5-trimethyl-1-hexanol, 3-heptanol, 1-octanol, 2-octanol, 2-ethyl-1-hexanol, 2-methyl-1-hexanol, 1-nonanol, 2-nonanol, 1-decanol, 2-decanol, 1-dodecanol, 1-tridecanol, 2-tridencanol, 1-tetradecanol, 1-octadecanol, 2-octadecanol, citronellol, dihydrocitronellol, 2-propylheptanol, isoborneal, phenylmethanol, phenoxyethanol, and the like.

The (meth)acrylate is often selected from methyl acrylate, ethyl acrylate, n-butyl acrylate, lauryl acrylate, 2-ethylhexyl acrylate, cyclohexyl acrylate, isooctyl acrylate, octadecyl acrylate, nonyl acrylate, decyl acrylate, isobornyl acrylate, dodecyl acrylate, benzyl acrylate, and mixtures thereof.

Other optional co-monomers can also be present in the second monomer composition. These optional co-monomers include, but are not limited to, (meth)acrylamide, N,N-dialkyl(meth)acrylamides (e.g., N,N-dimethylacrylamide and N,N-diethylacrylamide), N,N-dialkylaminoalkyl(meth)acrylate (e.g., N,N'-dimethylaminoethyl(meth)acrylate), (meth)acrylonitrile, vinyl acetate, N-vinyl pyrrolidone, cyanoalkyl (meth)acrylate (e.g., cyanoethyl acrylate), and hydroxyalkyl (meth)acrylates (e.g., hydroxyethylmethacrylate). Still other suitable co-monomers include poly(alkylene oxide) acrylates such as polyethylene glycol acrylate, ethoxyethyl acrylate, and ethoxyethoxyethylacrylate.

The second monomer composition often contains 1 to 30 weight percent (meth)acrylic acid and 70 to 99 weight percent (meth)acrylate (i.e., (meth)acrylate ester). The weight percent is based on a total weight of monomers in the second monomer composition used to prepare the second polymeric material. Polymeric materials having this composition tend to be elastomeric materials with a glass transition temperature that is less than 20° C., less than 10° C., less then 0° C., less than −10° C., or less than −20° C. Such polymeric materials can be used in various adhesive compositions such as pressure-sensitive adhesive compositions. If higher amounts of (meth)acrylic acid are included, the glass transition temperature and stiffness of the second polymeric material may become undesirably high. If the (meth)acrylic acid is too low, however, the probability of reacting the second polymeric material with the first compound diminishes or there are very few grafted sites in the resulting grafted copolymer. The cohesive strength of the grafted polymer and any adhesive containing the grafted copolymer may become unacceptably low if there are too few grafted sites.

In some examples, the second monomer composition contains 1 to 25 weight percent (meth)acrylic acid and 75 to 99 weight percent (meth)acrylate ester, 1 to 20 weight percent (meth)acrylic acid and 80 to 99 weight percent (meth)acrylate ester, 1 to 15 weight percent (meth)acrylic acid and 85 to 99 weight percent (meth)acrylate ester, 1 to 10 weight percent (meth)acrylic acid and 90 to 99 weight percent (meth)acrylate ester, or 5 to 15 weight percent (meth)acrylic acid and 85 to 95 weight percent (meth)acrylate ester based on the total weight of monomers in the second monomer composition.

In addition to monomers, the second monomer composition typically also includes an initiator for free radical polymerization of the various monomers. The polymerization initiator can be a thermal initiator, a photoinitator, or both. Any suitable thermal initiator or photoinitator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of monomers in the second monomer composition.

In some embodiments, a thermal initiator is used. The thermal initiator is typically a peroxide, azo compound, persulfate, or redox (reduction-oxidation) system. Suitable peroxides include, but are not limited to, benzoyl peroxide, cyclohexane peroxide, decanoyl peroxide, dicumyl peroxide, dicetyl peroxydicarbonate, and lauryl peroxide. Suitable azo compounds include, but are not limited to, 2,2'-azobis(2-methylbutane nitrile) that is commercially available under the trade designation VAZO 67 from DuPont (Wilmington, Del.), 2,2'-azobis(isobutyronitrile) that is commercially available as VAZO 64 from DuPont, and 2,2'-azobis(2,4-dimethylpentane nitrile) that is commercially available as VAZO 52 from DuPont. Suitable persulfates include, but are not limited to, potassium persulfate, sodium persulfate, and ammonium persulfate. Suitable redox systems include, but are not limited to, the combination of a persulfate with a reducing agent such as sodium metabisulfite or sodium bisulfite, a peroxide in combination with a tertiary amine such as dimethylaniline, or a hydroperoxide (e.g., cumene hydroperoxide) in combination with a transition metal (e.g., cobalt naphthanate).

In some embodiments, a photoinitiator is used. Some example photoinitiators are benzoin ethers (e.g., benzoin methyl ether or benzoin isopropyl ether) and substituted benzoin ethers (e.g., anisoin methyl ether). Other example photoinitiators are substituted acetophenones such as 2,2-diethoxyacetophenone or 2,2-dimethoxy-2-phenylacetophenone (commercially available under the trade designation IRGACURE 651 from Ciba Corp. (Tarrytown, N.Y.) or under the trade designation ESACURE KB-1 from Sartomer (Exton, Pa.)). Still other example photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime.

The second monomer composition typically also includes a chain transfer agent to control the molecular weight of the second polymeric material by regulating the free radical polymerization reaction. Suitable chain transfer agents include, but are not limited to, halogenated hydrocarbons (e.g., carbon tetrabromide), sulfur compounds such as mercaptans (e.g., lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and mercaptoethyl ether). Certain organic solvents can also function as a chain transfer agent such as ethanol, isopropanol, and ethyl acetate.

The amount of the chain transfer agent that is included in the second monomer composition depends on the desired molecular weight and on the specific chain transfer agent used. Compared to sulfur compounds, for example, organic solvents are usually less active and need to be present in larger quantities. The chain transfer agent is often present in an amount in the range of 0.001 to 10 weight percent based on a total weight of monomers in the second monomer composition. The amount is often in the range of 0.01 to 5 weight percent, 0.01 to 2 weight percent, 0.01 to 1 weight percent, or 0.01 to 0.5 weight percent based on the total weight of monomers in the second monomer composition.

The second polymeric material can be prepared from the second monomer composition using any suitable method or process (e.g., U.S. Pat. No. 5,986,011 (Ellis)). In many embodiments, a method without an inert organic solvent or a method with only a small amount of the inert organic solvent is used (e.g., less than 5 weight percent, less than 3 weight percent, less than 2 weight percent, less than 1 weight percent, or less than 0.5 weight percent based on the total weight of the second monomer composition). Such methods can be used if the monomers and the resulting copolymeric material are miscible with each other. In some embodiments, however, larger amounts of an inert organic solvent are used to provide miscibility of the reactants and product. When included in the second monomer composition, the inert organic solvent is typically no greater then 20 weight percent, no greater than 15 weight percent, or no greater than 10 weight percent based on the total weight of the second monomer composition.

In some processes used to form the second polymeric material, the second monomer composition can be positioned on a sheet, positioned between two sheets, or at least partially surrounded by a packaging material prior to polymerization. The sheets or packaging material are often selected based on the particular polymerization method used to prepare the second polymeric material. Flexible thermoplastic polymers such as, for example, ethylene-vinyl acetate copolymers, ethylene-acrylic acid copolymers, polypropylene, polyethylene, polybutadiene, polyethylene terephthalate, or iconomeric polymers can be used.

In some embodiments, the second monomer composition is polymerized within a packaging material such as a sealed pouch as described in U.S. Pat. No. 5,804,610 (Hamer et al.). The amount of packaging material used typically ranges from about 0.5 weight percent to about 20 weight percent based on a total weight of the packaging material and second monomer composition. For example, the packaging material can be in the range of 1 to 20 weight percent, 1 to 15 weight percent, 2 to 15 weight percent, 1 to 10 weight percent, 2 to 10 weight percent, 1 to 5 weight percent, or 2 to 5 weight percent. The thickness of the packaging material is often in the range of 0.01 millimeters to 0.25 millimeters, in the range of 0.01 to 0.20 millimeters, in the range of 0.01 to 0.10 millimeters, or in the range of 0.03 to 0.10 millimeters. The pouch can have any suitable size but often the size is selected to contain 0.1 to 500 grams, 1 to 500 grams, 1 to 200 grams, 1 to 100 grams, 2 to 100 grams, 5 to 100 grams, or 5 to 50 grams of the second monomer composition.

If a thermal polymerization process is used, suitable sheets or packaging materials typically have melting temperatures that are above the polymerization temperature of the second monomer composition. The sheets or packaging materials often have a melting point of at least 90° C., at least 100° C., or at least 120° C. The melting point is often less than 200° C., less than 175° C., or less than 150° C. The polymerization temperature depends on the activation temperature of the thermal initiator. For example, reactions using 2,2'-azobis (isobutyronitrile) can be carried out at about 80° C. while reactions using 2,2'-azobis(2,4-dimethylpentane nitrile) can be carried out at about 70° C.

In some thermal polymerization processes, the packaging material containing the second monomer composition is immersed within a heat exchange medium for a time sufficient to polymerize the monomers. The heat exchange medium can be, for example, water, perfluorinated liquids, glycerine, or propylene glycol. Alternatively, the heat necessary for thermal polymerization can be provided by placing the packaged second monomer composition in proximity to a heated metal platen, heated metal rollers, or microwave energy.

If a photo-polymerization process is used, suitable sheets or packaging materials typically allow sufficient actinic radiation (e.g., ultraviolet radiation) to reach the second monomer composition through the sheets or packaging materials. Ultraviolet lights are often selected that have at least 60 percent or at least 70 percent of their emission spectra in the range of 280 to 400 nanometers and that have an intensity between about 0.1 to 25 mW/cm$^2$.

During some photo-polymerization processes, the temperature can be controlled by immersing sealed pouches containing the second monomer composition in a water bath or other heat transfer fluid. For example, the packaged second monomer composition can be immersed in a water bath controlled at temperatures up to 90° C. but is often controlled at temperatures no greater than 50° C. The temperature is often controlled in the range of 5 to 50° C., 5 to 40° C., or 5 to 30° C.

Although any desired molecular weight second polymeric material can be prepared and used in Reaction Scheme B, the weight average molecular weight is often at least 50,000 grams/mole, at least 100,000 grams/mole, at least 200,000 grams/mole, or at least 500,000 grams/mole. In some embodiments, the weight average molecular weight can be up to 3,000,000 grams/mole, up to 2,000,000 grams/mole, or up to 1,000,000 grams/mole. Mixing of the second polymeric material with the first compound can become more difficult as the molecular weight of the second polymeric material increases.

If the second polymeric material is an elastomeric material, the weight average molecular weight is often in the range of 200,000 to 2,000,000 grams/mole, in the range of 200,000 to 1,000,000 grams/mole, in the range of 500,000 to 2,000,000 grams/mole, or in the range of 500,000 to 1,000,000 grams/mole. If the molecular weight is too high, the elastomeric material does not flow well and preparing coatings from the resulting grafted copolymer can be difficult. If the molecular weight if too low, however, the cohesive strength may be undesirably low.

To prepare a grafted copolymer, the second polymeric material having at least one acidic group (preferably multiple acidic groups) can be reacted with the first compound having both a single aziridinyl group and a first polymeric group. In the case where the acidic groups on the second compound are carboxyl groups, the reaction results in the formation of a grafted copolymer having at least one pendant group (preferably multiple acidic groups) of formula —(CO)OC(R$^1$)$_2$C(R$^1$)$_2$NH—R$^2$—NH—C(R$^1$)$_2$C(R$^1$)$_2$—O(CO)-Q where R$^1$, R$^2$, and Q are the same as defined above.

If the second polymeric material is copolymer formed from a second monomer composition that contains (meth)acrylic acid and a (meth)acrylate ester, the resulting grafted copolymer often has a hydrocarbon backbone with pendant groups that include —(CO)OR$^{11}$ groups and —(CO)OC(R$^1$)$_2$C(R$^1$)$_2$NH—R$^2$—NH—C(R$^1$)$_2$C(R$^1$)$_2$—O(CO)-Q groups. The group R$^1$, R$^2$, R$^{11}$, and Q are the same as previously defined. The —(CO)OR$^{11}$ groups are from the (meth)acrylate esters included in the second monomer mixture. The pendant groups —(CO)OC(R$^1$)$_2$C(R$^1$)$_2$NH—R$^2$—NH—C(R$^1$)$_2$C(R$^1$)$_2$—O(CO)-Q result from reaction of a carboxyl group on the second polymeric material with the aziridinyl group on the second compound. If there are non-reacted —(CO)OH groups from the (meth)acrylic acid used to form the second polymeric material, these groups can also be present in the grafted copolymer.

In some embodiments of the grafted copolymer, the second polymeric material is an elastomeric material formed from a second monomer composition that contains (meth)acrylic acid and a (meth)acrylate ester while the first compound is selected to have a first polymeric group Q that is not miscible with the second polymeric material. That is, the first polymeric group Q phase separates from the second polymeric material. This phase separation results in the formation of separate domains of the first polymeric group that function as physical crosslinks for the grafted copolymer. The grafted copolymer can be used as an adhesive such as a pressure sensitive adhesive. The cohesive strength of the adhesive tends to increase with the introduction of more grafted groups (i.e., through the introduction of more —(CO)OC(R$^1$)$_2$C(R$^1$)$_2$NH—R$^2$—NH—C(R$^1$)$_2$C(R$^1$)$_2$—O(CO)-Q pendant groups) in the grafted compound.

Physical crosslinking typically relies on the natural or induced formation of entanglements within polymeric chains and tends to increase the cohesive strength of adhesive compositions such as pressure-sensitive adhesive compositions. Physical crosslinking is often desired because the pressure-sensitive adhesive can be processed in a melted state at relatively high temperatures yet can take on a crosslinked form at lower temperatures. That is, the pressure-sensitive adhesives can be used as hot melt adhesives. In contrast, chemical crosslinked pressure-sensitive adhesives typically cannot be processed as hot melt adhesives. Hot melt processing is often considered desirable because the use of inert organic solvents can be minimized or eliminated. The minimization or elimination of inert organic solvents can be desirable from both an environmental and economic perspective.

To phase separate from a second polymeric material that is elastomeric and to provide physical crosslinking, the first compound is often selected to be immiscible in the second compound at ambient temperatures. Physical crosslinking is enhanced when the first compound has a glass transition temperature greater than or equal to at least 20° C. To form such a first compound, the monomers used to form polymeric group Q are often selected to have a glass transition temperature equal to at least 20° C. when polymerized as a homopolymer. Suitable monomers can be (meth)acrylates or various vinyl monomers such as vinyl ether monomers, vinyl aryl monomers, vinyl heterocyclic monomers, vinyl ester monomers, and the like.

Specific monomers for forming polymeric group Q include, but are not limited to, methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxylethyl(meth)acrylate, dicyclopentanyl(meth)acrylate, and 3,3,5 trimethylcyclohexyl(meth)acrylate, styrene, alphamethyl styrene, alkyl substituted styrene (e.g., vinyl toluene, dimethylstytrene, ethylstyrene, isopropylstyrene, tert-butylstyrene), 2-vinyl pyridine, 4-vinyl pyridine, n-vinylcarpolactam, vinyl acetate, vinyl proprionate, or mixtures thereof.

In addition to the glass transition temperature, the molecular weight of the first compound (e.g., the molecular weight of the polymeric group Q) can affect whether or not the grafted copolymer will phase separate and physically crosslink. Phase separation is more likely if the molecular weight of the polymeric group Q in the first compound has a weight average molecular weight of at least 5000 grams/mole. That is, the first compound is selected to have a weight average molecular weight that is greater than 5000 grams/mole. The weight average molecular weight of the group Q is often greater than 7,500 grams/mole, greater than 10,000 grams/mole, greater than 12,000 grams/mole, greater than 15,000 grams/mole, or greater than 20,000 grams/mole. Cohesive strength of the pressure-sensitive adhesive tends to increase as the weight average molecular weight of the polymeric group Q increases.

If higher molecular weight of the polymeric group Q becomes too large, however, the number of pendant groups formed on a weight basis by reaction with the second polymeric material may be diminished. That is, as the weight of the polymeric group Q increases, it can become more difficult to form many pendant groups of formula $—(CO)OC(R^1)_2C(R^1)_2NH—R^2—NH—C(R^1)_2C(R^1)_2—O(CO)\text{-Q}$ on a weight basis. The weight average molecular weight of polymeric group Q is often up to 150,000 grams/mole. For example, the weight average molecular weight can be up to 120,000 grams/mole, up to 100,000 grams/mole, up to 80,000 grams/mole, up to 60,000 grams/mole or up to 40,000 grams/mole.

Some specific grafted copolymers are formed from an elastomeric second polymeric material and a first compound that is not miscible with the second polymeric material. The first compound has a Q polymeric group that is homopolymer such as a poly(vinyl aryl monomer) (e.g., poly(styrene), a block copolymer having a first block of poly(vinyl aryl monomer) and a second block of poly(vinyl heterocylic monomer) (e.g., di-block poly(styrene-co-vinyl pyridine), or a random copolymer of a poly(vinyl aryl monomer) and a poly(vinyl heterocyclic monomer) (e.g., random poly(styrene-co-vinyl pyridine). The second polymeric material can be a polymerized product of a second monomer composition that contains a (meth)acrylic acid and (meth)acrylate ester.

To prepare the grafted copolymer, the second polymeric material is often reacted with the first compound using a hot melt process. The second polymeric material is prepared and then mixed with the first compound. Any suitable hot melt method can be used to mix the first compound with the second compound. In some methods, the second polymeric material is positioned within a packaging material (e.g., the second polymeric material can be prepared within the packaging material) such as a pouch that is combined with the first compound within a mixing device such as those commercially available from C. W. Brabender (Hackensack, N.J.) or within an extruder. The mixing device can break open the packaging material surrounding the second polymeric material, melt the packaging material, or both.

Any suitable reaction time and temperature can be used that are sufficient to form the grafted copolymer and optionally melt the packaging material. For example, the first compound can be mixed with the second polymeric material at temperatures equal to at least 100° C., at least 110° C., or at least 120° C. for at least 1 minute, at least 2 minutes, at least 5 minutes, at least 10 minutes, or at least 20 minutes. A temperature and time are often selected such that the packaging material melts. The amount of packaging material and the type of packaging material are selected so that desired properties of the grafted compound are not adversely affected by the packaging material.

The grafted compound is often used as an adhesive. As such, the grafted compound is often tacky and can be used as a pressure-sensitive adhesive. If more tackiness is desired, however, additional tackifiers can be mixed with the grafted compound. Any tackifier typically included in pressure-sensitive adhesive compositions can be used. Either solid or liquid tackifiers can be added. Solid tackifiers generally have a number average molecular weight (Mn) no greater than about 10,000 grams/mole and a softening point above about 70° C. Liquid tackifiers are viscous materials that have a softening point of about 0° C. to about 70° C. Solid tackifying resins are generally preferred.

Suitable tackifying resins include rosins and their derivatives (e.g., rosin esters); polyterpenes and aromatic-modified polyterpene resins; coumarone-indene resins; and hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. These tackifying resins, if desired, can be hydrogenated to lower their color contribution to the pressure-sensitive adhesive layer.

The grafted copolymer plus any melted packaging material is often delivered as a film or coating using a die. This film or coating is often positioned on one or both major surfaces of a substrate. Any suitable substrate can be used such as those formed from metal-containing materials, polymeric materials, ceramic materials, or glasses. The substrate can be rigid or flexible, clear or opaque, and of any suitable thickness. If the film or coating is a pressure-sensitive adhesive, the substrate can be a backing material. Suitable backings include, but are not limited to, paper, cloth (woven or non-woven), poly(vinyl chloride), polyurethane, polyolefin (e.g., polyethylene, polypropylene, or copolymers thereof), polyesters such as polyethylene terephthalate, nylon, polycarbonate, poly(ethylene vinyl acetate), poly(ethylene acrylic acid), foams such as those prepared from polyurethanes or polyacrylates, metal foil, and the like.

In some embodiments, the grafted copolymer is positioned between two substrates. The first substrate can be, for example, a backing suitable for a pressure-sensitive adhesive and the second substrate can be a release liner. Any suitable release liner can be used such as, for example, a backing coated with a silicone coating (silicone release liner), polyfluorpolyether coating, or polyfluoroethylene coating.

Besides being used in adhesive compositions, the grafted copolymers can be used to chemically alter various other surfaces and materials. For example, the second compound can be any carboxyl-containing material such as a membrane having carboxyl groups or surface modified with a carboxyl-containing material, inorganic material surface modified with a carboxyl-containing material, fibers having carboxyl groups or surface modified with a carboxyl-containing material, super adsorbant polymers having carboxyl groups, or the like. Reacting these carboxyl-containing material with a compound of Formula (I) can be used to provide a material with an altered contact angle, altered wettability, or altered compatibility with other materials. For example, a hydrophilic surface can be altered to form a hydrophobic surface.

Various items are provided that are a reaction mixture, a grafted copolymer, or a method of making a grafted copolymer.

Item 1 is a reaction mixture. The reaction mixture includes (a) a first compound of Formula (I)

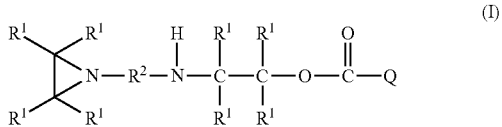

and (b) a second compound having at least one acidic group. In Formula (I), each $R^1$ is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a first monomer composition that includes at least one ethylenically unsaturated monomer.

Item 2 is the reaction mixture of item 1, wherein the second compound is a polymeric material (i.e., second polymeric material) having multiple acidic groups.

Item 3 is the reaction mixture of item 1 or 2, wherein the second compound is an elastomeric material having multiple carboxyl groups.

Item 4 is the reaction mixture of any one of items 1 to 3, wherein the second compound is a polymerized product of a second monomer composition comprising (a) (meth)acrylic acid and (b) at least one (meth)acrylate ester.

Item 5 is the reaction mixture of any one of items 1 to 4, wherein Q is has a weight average molecular weight greater than 5000 grams/mole.

Item 6 is the reaction mixture of any one of items 1 to 5, wherein the at least one ethylenically unsaturated monomer used to form Q is selected to have a glass transition temperature equal to at least 20° C. when polymerized as a homopolymer.

Item 7 is the reaction mixture of any one of items 1 to 6, wherein the first monomer composition comprises styrene, alpha-methyl styrene, or an alkyl substituted styrene.

Item 8 is the reaction mixture of any one of items 1 to 6, wherein the first monomer composition comprises a (meth)acrylate ester, (meth)acrylamide, or a combination thereof.

Item 9 is the reaction mixture of any one items 1 to 6, wherein the group Q is a random copolymer and the first monomer composition comprises a vinyl aryl monomer and a vinyl heterocyclic monomer.

Item 10 is the reaction mixture of any one of items 1 to 6, wherein the group Q is a block copolymer and the first monomer composition comprises a first block of poly(vinyl aryl monmer) and a second block of poly(vinyl heterocylic monomer).

Item 11 is a grafted copolymer. The grafted copolymer is a product of a reaction mixture that includes (1) a first compound of Formula (I)

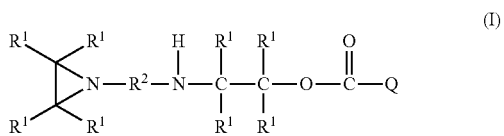

and (2) a second compound that is a polymeric material having at least one acidic group. In Formula (I), each $R^1$ is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a first monomer composition that includes at least one ethylenically unsaturated monomer.

Item 12 is the grafted copolymer of item 11, wherein the second compound is an elastomeric material prepared from a second monomer composition comprising (a) (meth)acrylic acid and (b) at least one (meth)acrylate ester.

Item 13 is the grafted copolymer of item 11 or 12, wherein group Q has a weight average molecular weight greater than 5000 grams/mole.

Item 14 is the grafted copolymer of any one of items 11 to 13, wherein the at least one ethylenically unsaturated monomer used to form group Q is selected to have a glass transition temperature equal to at least 20° C. when polymerized as a homopolymer.

Item 15 is a method of making a grafted copolymer. The method includes forming a reaction mixture that includes (1) a first compound of Formula (I)

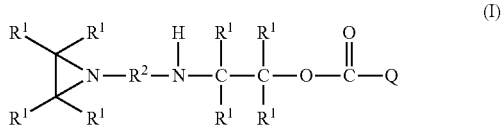

and (2) a second compound that is a polymeric material having at least one acidic group. In Formula (I), each $R^1$ is independently hydrogen or an alkyl. The group $R^2$ is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a first monomer composition that includes at least one ethylenically unsaturated monomer. The method further includes reacting an aziridinyl group of the first compound with at least one acidic group of the second compound to form the grafted copolymer.

Item 16 is the method of item 15, wherein the reaction mixture contains 0 to less than 5 weight percent inert organic solvent based on a total weight of the reaction mixture.

Item 17 is the method of item 15 or 16, wherein the second polymeric material is an elastomeric prepared from a second monomer composition comprising (a) (meth)acrylic acid and (b) at least one (meth)acrylate ester.

Item 18 is the method of any one of items 15 to 17, wherein group Q has a weight average molecular weight greater than 5000 grams/mole.

Item 19 is the method of any one of items 15 to 18, wherein the at least one ethylenically unsaturated monomer used to form group Q is selected to have a glass transition temperature equal to at least 20° C. when polymerized as a homopolymer.

Item 20 is the method of any one of items 15 to 19, wherein the method is a hot melt process.

Item 21 is the method of any one of items 15 to 20, wherein the reaction mixture contains 0 to 5 weight percent inert organic solvent based on a total weight of the reaction mixture.

EXAMPLES

All percents are based on weight unless otherwise indicated.

The materials used in the following examples were purchased from Alfa Aesar (Ward Hill, Mass.) or Sigma-Aldrich Company (St. Louis, Mo.) unless otherwise stated.

Inhibitor removal from the monomers was done by passing the monomers slowly through a column packed with Inhibitor Removal Resin (CAS #9003-70-7) from Alpha Aesar (Ward Hill, Mass.). Monomers treated in this manner are referred to as "treated monomers".

Test Method: Molecular Weight Distribution

The molecular weight distribution of the compounds was characterized using conventional gel permeation chromatography (GPC). The GPC instrumentation, which was obtained from Waters Corporation (Milford, Mass.), included a high pressure liquid chromatography pump, an auto-sampler, a UV detector, and a refractive index detector. The chromatograph was equipped with two 5 micron PLgel MIXED-D columns that are available from Varian Inc. (Palo Alto, Calif.).

Samples of polymeric solutions were prepared by dissolving polymer or dried polymer samples in tetrahydrofuran at a concentration of 0.5 percent (weight/volume) and by filtering through a 0.2 micron polytetrafluoroethylene filter that is available from VWR International (West Chester, Pa.).

The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Shear Strength

Shear strength of an adhesive material is directly related to the internal strength or cohesiveness of the sample and is typically quantified by the amount of force required to pull an adhesive strip from a standard flat surface to which the adhesive strip is affixed. Specifically, shear strength is measured in terms of the time required to pull a defined area of adhesive coated backing material from a stainless steel test panel under the stress of a constant or static load parallel to the test panel.

Shear tests were conducted using adhesive strip prepared by coating polyethylene terephthalate film (PET) with an adhesive coating having a thickness of about 0.05 millimeters (mm). Cut adhesive strips were applied to a clean stainless steel panel such that a 25.4 mm by 25.4 mm portion of each adhesive strip was in firm contact with the panel and one end portion of each adhesive strip was free (i.e., not attached to the panel). The panel with adhesive strip was held in a rack such that the panel forms an angle of 180 with the extended free end which is subjected to tension by applying a one kilogram hanging weight. The time elapsed for each adhesive strip to separate from the test panel is recorded as the shear strength in minutes. Two shear tests were performed for each sample adhesive and the results averaged.

Peel Adhesion

Peel adhesion, which is the force required to remove an adhesive strip from a stainless steel test panel measured at a specific angle and rate of removal and is expressed in Newtons per width of the adhesive strip (N/dm). For each test, an adhesive strip with a width of approximately 12.5 mm and a length of 10-12 centimeters (cm) was applied to a clean face of the test panel. A hard rubber roller was used to affix the adhesive strip. The free end of the adhesive strip was doubled back so that the angle of removal was 180 degrees. The free end was attached to the horizontal arm of the adhesion tester scale (Slip/Peel Tester Model 3M90 from Instrumentors, Inc. (Strongsville, Ohio)). The stainless steel plate was then attached to the platform of the instrument that moves at a controlled rate (12"/min) away from the scale. The peel test was started soon after the adhesive strip was applied to the test panel without allowing for an induction time for adhesion to build.

The scale reading in Newtons was read during the test as an average of both the peak and minimum forces during the peel. Three peel tests were run for each sample and averaged to yield the peel adhesion value.

Preparatory Examples P1 and P2

Acid-containing Polystyrene

An acid terminated (acid-containing) polystyrene polymer P1 was prepared by adding 100 grams of treated styrene monomer to a 500 milliliter (mL) flask along with 2.34 grams of 4,4' azobis(4-cyanovaleric acid) (ABCVA) initiator, 0.85 grams of 2,2,6,6-tetramethyl-1-piperidinyloxy (TEMPO), and a magnetic stir bar. The flask was sealed with a rubber septum, mixed well, and bubbled with nitrogen for 20 minutes. The flask was then transferred to an oil bath at 135° C. and held at that temperature for 10 hours. During the reaction, the initially red monomer formulation changed to a light yellowish color. The product was allowed to cool and then was slowly added to a large excess of cold methanol. The precipitated polymer was collected and dried overnight in a vacuum oven. _Based on gel permeation chromatography (GPC) analysis, the weight average molecular weight (Mw) was 15,000 grams/mole with a polydispersity of 1.08.

Another acid terminated p(styrene) polymer P2 was prepared using this method but varying the amount of ABCVA and TEMPO used as shown in Table 1.

TABLE 1

| Preparation of P1 and P2 | | | | | |
|---|---|---|---|---|---|
| Preparatory Example | Styrene (grams) | ABCVA (grams) | TEMPO (grams) | Mw (g/mole) | Polydispersity Index |
| P1 | 100 | 2.34 | 1.3 | 15,000 | 1.08 |
| P2 | 100 | 2.34 | 0.55 | 24,150 | 1.15 |

The polymerization reaction used to from P1 and P2 is shown in Reaction Scheme C.

Reaction Scheme C

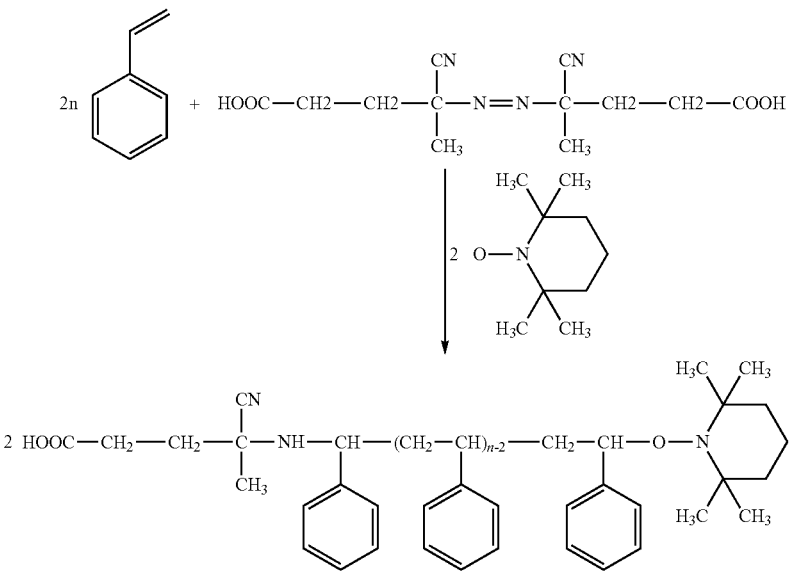

Preparatory Examples P3 and P4

Aziridinyl-containing Polystyrene

An aziridinyl-terminated (aziridinyl-containing) polystyrene polymer P3 was prepared by reacting the acid-containing polymer P1 with an excess of a difunctional aziridine compound. Specifically, 50 grams of the acid functional polymer P1 was dissolved in 120 grams of a solution of 5 weight percent solution of 1,1'-isophthalaylbis(2-methylaziridine) in toluene.

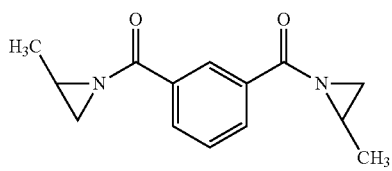

After mixing well for 24 hours, the resulting solution was slowly added to a large excess of cold methanol. The precipitated polymer was collected, dried under vacuum, and re-dissolved in toluene. The polymer was precipitated a second time into cold methanol, collected, and dried overnight under vacuum. Based on GPC analysis, the weight average molecular weight was 15,300 grams/mole with a polydispersity index of 1.10.

An additional aziridinyl-terminated polystyrene polymer P4 was prepared using this method but starting with the acid-containing polystyrene polymer P2. The amount of bisaziridine solution used to functionalize each polymer was dependant on the concentration of ABCVA used to make the acid-containing polymer precursor. More specifically, the 1,1'-isophthalaylbis(2-methylaziridine) was always at a six fold molar excess compared to the amount of ABVCA used.

TABLE 2

Preparation of P3 and P4

| Preparatory Example | Acid-containing polymer | Acid-containing polymer (grams) | Bisaziridine, 5 wt % solution (grams) | Mw (grams/mole) | Polydispersity Index |
|---|---|---|---|---|---|
| P3 | P1 | 50 | 120 | 15,300 | 1.10 |
| P4 | P2 | 50 | 80 | 24,500 | 1.17 |

Preparatory Examples P5 and P6

Acid-containing poly(benzyl methacrylate)

An acid-terminated (acid-containing) poly(benzyl methacrylate) polymer P5 was prepared by adding 100 grams of benzyl methacrylate (BMA), 1.17 grams of 3-mercaptopropionic acid (MPA), 0.44 grams of thermal initiator 2,2'-Azo-Bis(2-methylbutyronitrile) (VAZO-67 from DuPont (Wilmington, Del.)) and 100 grams of toluene to a narrow necked glass bottle containing magnetic stir bar. The formulation was mixed well and bubbled with nitrogen for 20 minutes. The bottle was then sealed and placed in a rotating and heated water bath (commercially available under from Atlas, Inc. (Athens, Ga.) under the trade designation Launder-O-meter) at 70° C. for 20 hours. After cooling, the solution polymer was slowly added to a large excess of cold methanol. The precipitate was collected and dried overnight under vacuum. Based on GPC analysis, the final product P5 had a weight average molecular weight (Mw) of 16,250 grams/mole with a polydispersity index of 1.79.

Another acid-terminated poly(benzyl methacrylate) polymer P6 of was prepared using this method but varying the amount of mercaptopropionic acid used as shown in Table 3.

TABLE 3

Preparation of P5 and P6

| Preparatory Example | BMA (grams) | MPA (grams) | ABCVA (grams) | Toluene (grams) | Mw (grams/mole) | Polydispersity Index |
|---|---|---|---|---|---|---|
| P5 | 100 | 1.17 | 0.44 | 100 | 16,500 | 1.82 |
| P6 | 100 | 0.63 | 0.44 | 100 | 28,000 | 1.85 |

Preparatory Examples P7 and P8

Aziridinyl-containing Poly(benzyl methacrylate)

An aziridinyl-terminated (aziridinyl-containing) p(benzyl methacrylate) polymer P7 was prepared following the same procedural steps as in Preparatory Example 3 except that 75 grams of the acid-containing poly(benzyl methacryalte) polymer P5 was used instead of P2. Polymer P5 was dissolved in 100 grams of a solution of 5 weight percent 1,1'-isophthalaylbis(2-methylaziridine) in toluene. Based on GPC analysis, the weight average molecular weight (Mw) was 16,700 grams/mole with a polydispersity of 1.80.

Another aziridinyl terminated poly(benzyl methacrylate) polymer P8 was prepared using this method but starting with the acid-containing polymer P6. The amount of bisaziridine solution used to functionalize the polymer was dependant on the concentration of mercaptopropionic acid used to make the acid functional polymer precursor. More specifically, the 1,1'-isophthalaylbis(2-methylaziridine) was always at a three fold molar excess to the amount of mercaptopropionic acid used.

TABLE 4

Preparation of P7 and P8

| Preparatory Example | Acid-containing polymer | Acid-containing polymer (grams) | Bisaziridine, 5 wt % solution (grams) | Mw (grams/mole) | Polydispersity Index |
|---|---|---|---|---|---|
| P7 | P5 | 75 | 100 | 16,700 | 1.78 |
| P8 | P6 | 75 | 50 | 28,400 | 1.90 |

Preparatory Examples P9 and P10

Acid-containing Poly(methyl methacrylate)

An acid-terminated (acid-containing) poly(methyl methacrylte) polymer P9 was prepared by adding 56 grams of methyl methacrylate (MMA), 0.83 grams of 3-mercaptopropionic acid (MPA), 0.55 grams of thermal initiator 2,2'-Azo-Bis(2-methylbutyronitrile) (VAZO-67), and 45 grams of toluene to a narrow necked glass bottle containing a magnetic stir bar. The formulation was mixed well and bubbled with nitrogen for 20 minutes. The bottle was then sealed and placed in rotating and heated water bath (commercially available under from Atlas, Inc. (Athens, Ga.) under the trade designation Launder-O-meter) at 70° C. for 20 hours. After cooling, the solution polymer was slowly added to a large excess of cold methanol. The precipitate was collected and dried overnight under vacuum. Based on GPC analysis, the final product P9 had a weight average molecular weight (Mw) of 14,850 grams/mole.

Another acid terminated p(methyl methacrylate) polymer P10 was prepared using this method but varying the amount of mercaptopropionic acid used as shown in Table 5.

TABLE 5

Preparation of P9 and P10

| Preparatory Example | MMA (grams) | MPA (grams) | ABCVA (grams) | Toluene (grams) | Mw (grams/mole) |
|---|---|---|---|---|---|
| P9 | 56 | 0.83 | 0.55 | 45 | 14,850 |
| P10 | 56 | 0.50 | 0.55 | 45 | 23,650 |

Preparatory Examples P11 and P12

Aziridinyl-containing Poly(methyl methacrylate)

Aziridinyl-terminated (aziridinyl-containing) poly(methyl methacrylate) polymer P11 was prepared following the same procedural steps as in Preparatory Example 3 except that 50 grams of acid-containing poly(methyl methacrylate) polymer P9 was used in place of P1. P9 was dissolved in 66 grams of a solution of 5 weight percent 1,1'-isophthalaylbis(2-methylaziridine) in toluene. Based on GPC analysis, the final product P11 had a weight average molecular weight (Mw) of 15,100 grams/mole with a polydispersity index of 1.26.

Another aziridine terminated poly(methyl methacrylate) polymer P12 was prepared using this method but starting with the acid-containing polymer P10 described in Table 5. The amount of bisaziridine solution used to functionalize the polymer was dependant on the concentration of mercaptopropionic acid used to prepare the acid-containing polymer precursor. More specifically, the amount of 1,1'-isophthalaylbis (2-methylaziridine) used in was equal to at least a three fold molar excess compared to the amount of mercaptopropionic acid used.

TABLE 6

Preparation of P11 and P12

| Preparatory Example | Acid-containing polymer | Acid-containing polymer (grams) | Bisaziridine, 5 wt % solution (grams) | Mw (grams/mole) | Polydispersity Index |
|---|---|---|---|---|---|
| P11 | P9 | 50 | 66 | 15,100 | 1.26 |
| P12 | P10 | 55 | 50 | 24,300 | 1.36 |

Preparatory Example P13

Acid-containing Random Poly(styrene-co-vinyl pyridine)

An acid-terminated (acid-containing) random poly(styrene-co-vinyl pyridine) polymer P13 was prepared by adding 45 grams of treated styrene monomer and 5 grams of treated vinyl pyridine monomer to a 250 mL flask along with 0.7 grams of ABCVA initiator, 0.383 grams of 2,2,6,6-tetramethyl-1-piperidinyloxy (TEMPO), and a magnetic stir bar. The flask was sealed with a rubber septum, mixed well, and bubbled with nitrogen for 20 minutes. The flask was then transferred to an oil bath at 135° C. and held at that temperature for 10 hours. During the reaction, the initially red monomer formulation changed to a light yellowish color. The product was then allowed to cool and was slowly added to a large excess of cold methanol. The precipitated polymer was collected and dried overnight in a vacuum oven. Based on GPC analysis, the weight average molecular weight (Mw) was 18,800 grams/mole with a polydispersity index of 1.22.

Preparatory Example P14

Aziridinyl-containing Random Poly(styrene-co-vinyl pyridine)

An aziridinyl-terminated (aziridinyl-containing) poly(styrene-co-vinyl pyridine) polymer P14 was prepared following the same procedural steps as in Preparatory Example 3 using acid-containing polymer P13 instead of acid-containing polymer P1. More specifically, 50 grams of acid-containing polymer P13 was dissolved in 40 grams of a solution of 5 weight percent 1,1'-isophthalaylbis(2-methylaziridine) in toluene. Based on GPC analysis, the final product P14 had weight average molecular weight (Mw) of 18,250 with a polydispersity of 1.28.

Preparatory Example P15

Acid-containing Block Poly(styrene-co-vinyl pyridine)

An acid terminated (acid-containing) block poly(styrene-co-vinyl pyridine) polymer P15 was prepared using treated styrene and treated vinyl pyridine (each monomer was passed slowly through a column packed with inhibitor removal resin and collected). A combination of 45 grams of treated styrene monomer, 0.7 grams of ABCVA, and 0.383 grams TEMPO was added to a 250 mL flask containing a magnetic stir bar. The flask was sealed with a rubber septum, mixed well, and bubbled with nitrogen for 20 minutes. The flask was then transferred to an oil bath at 135° C. and held at that temperature for 8 hours. During the reaction, the initially red monomer formulation changed to a light yellowish color.

After 8 hours, 10 grams of treated vinyl pyridine monomer was bubbled in a sealed flask with nitrogen for 5 minutes. Then 5 grams of vinyl pyridine was transferred to the polystyrene reaction flask using a syringe and the reaction temperature of 135C was held for an additional 5 hours. The reaction product was then allowed to cool and was slowly added to a large excess of cold methanol. The precipitated polymer was filtered, collected, and dried overnight in a vacuum oven. Based on GPC analysis, the final product P15 had a weight average molecular weight (Mw) of 15,400 grams/mole with a polydispersity index of 1.31.

Preparatory Example P16

Aziridinyl-containing Block Poly(styrene-co-vinyl pyridine)

An aziridinyl-terminated (aziridinyl-containing) block poly(styrene-co-vinyl pyridine) block polymer P16 was prepared following the same procedural steps as in Preparatory Example 3 except that the acid-containing polymer P15 was used instead of the acid-containing polymer P1. More specifically, 40 grams of the acid-containing polymer P15 was dissolved in 35 grams of a solution of 5 weight percent 1,1'-isophthalaylbis(2-methylaziridine) in toluene. Based on GPC analysis, the final product P16 had a weight average molecular weight (Mw) of 16,110 grams/mole with a polydispersity index of 1.25.

Preparatory Example P17

(N,N'-(hexane-1,6-diyl)bis-(2-methylaziridine-1-carboxamide))

2-Methyl aziridine (15.05 grams, 0.26 moles) was added drop wise over one hour to a solution of 1,6-diisocyanatohexane (20.00 grams, 0.12 moles, Aldrich) in toluene (40 mL) while cooling in an ice bath. After stirring for a total of 24 hours at room temperature, a potion of the solvent was removed under vacuum to give N,N'-(hexane-1,6-diyl)bis-(2-methylaziridine-1-carboxamide)

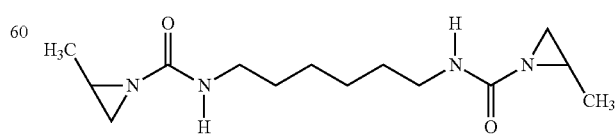

as a colorless oil (45.76 grams, concentration of 70 weight percent in toluene).

Preparatory Example P18

(3-Aziridin-1-yl-propionic acid 2-(3-aziridin-1-yl-propionyloxy)-hexyl ester))

HDODA (hexanediol diacrylate, 20.00 grams, 0.09 moles) that was obtained from Cytek, Inc. (Woodland Park, N.J.) and 2-methyl aziridine (15.07 grams, 0.26 moles) were stirred at room temperature overnight. The mixture was placed under vacuum with stirring for 1.5 hours to give the product (3-Aziridin-1-yl-propionic acid 2-(3-aziridin-1-yl-propionyloxy)-hexyl ester)

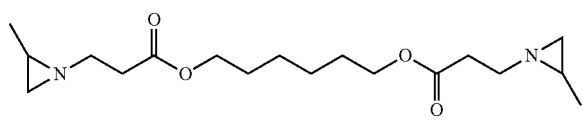

as a colorless oil (29.82 grams).

Preparatory Example 19

(1,10-decanediol bis(3-(2-methylaziridine-1-carbonyl)benzoic acid) ester)

Isophthaloyl dichloride (1950 grams, 9.60 moles) was added to a 3 L, three-neck, round bottom flask equipped with a magnetic stirrer, a thermometer, and a bubbler. The flask was heated at 55° C. Then 1,10-decanediol (112 grams, 0.64 moles) was added to the flask in portions. After stirring the reaction mixture at 55° C. for 1 hour, the excess isophthaloyl dichloride was removed by vacuum distillation (200 mTorr, 100° C.) and was recycled. A stream of dry nitrogen was bubbled through the mixture while distilling so that the isophthaloyl dichloride residue could be removed completely. The product, which was a white solid (311 grams), was 1,10-decanediol bis(3-chlorocarbonylbenzoic acid) ester.

An aqueous NaOH solution (563 grams of a 10.0 weight percent solution), toluene (500 mL), and 2-methylaziridine (89.3 grams of 90 percent pure 2-methylaziridine, 1.41 moles) was added to a 3 L, three-neck, round bottom flask equipped with a magnetic stirrer, a thermometer, and an addition funnel. The mixture was stirred and cooled in the range of −10° C. to −5° C. To this stirred mixture was added a solution of 1,10-decanediol bis(3-chlorocarbonylbenzoic acid) ester (311 grams) in toluene (500 mL) over a period of 30 minutes. When addition was complete, the mixture was stirred at room temperature overnight. The organic phase was then washed with water, dried over magnesium sulfate ($MgSO_4$), filtered and concentrated under vacuum at room temperature. The product was 331.5 grams of 1,10-decanediol bis(3-(2-methylaziridine-1-carbonyl)benzoic acid) ester

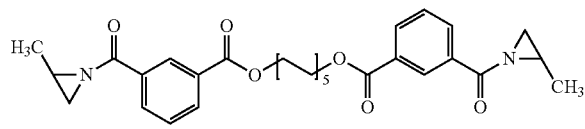

as a pale yellow oil. A 15 weight percent solution of this material in toluene was then prepared.

Preparatory Example P20

(Poly(ethylene glycol) 1000 bis(3-(2-methylaziridine-1-carbonyl)benzoic acid) ester)

Isophthaloyl dichloride (812 grams, 4.0 moles) was added to a 1 L, three-neck, round bottom flask equipped with a magnetic stirrer, thermometer, and an adapter. The flask was heated at 100° C. To this flask was added poly(ethylene glycol) 1000 (158 grams, 0.16 mole, weight average molecular weight of about 1000 grams/mole) in 25 portions. After stirring the reaction mixture at 100° C. for 1 hour, the excess of isophthaloyl dichloride was removed by vacuum distillation (200 mTorr, 100° C.) and was recycled. A stream of dry nitrogen was bubbled through the mixture while distilling so the isophthaloyl dichloride residue could be removed completely. A pale yellow liquid (210 grams), poly(ethylene glycol) 1000 bis(3-chlorocarbonylbenzoic acid) was obtained as product.

Triethylamine (35.1 grams, 0.35 moles), 2-methylaziridine (22.0 grams of 90 percent pure 2-methylaziridne, 0.35 moles), and $CH_2Cl_2$ (250 mL) was added a 1 L, three-neck, round bottom flask equipped with a magnetic stirrer, a thermometer, and an addition funnel. The mixture was stirred and cooled to −10° C. A solution of poly(ethylene glycol) 1000 bis(3-chlorocarbonylbenzoic acid) ester (210 grams) in $CH_2Cl_2$ (250 mL) was added over a period of 60 minutes. The mixture was allowed to stir at room temperature for 110 hours, after which a white precipitate was removed by filtration. The filtrate was concentrated under high vacuum at room temperature to give 203 grams of (poly(ethylene glycol) 1000 bis(3-(2-methylaziridine-1-carbonyl)benzoic acid) ester

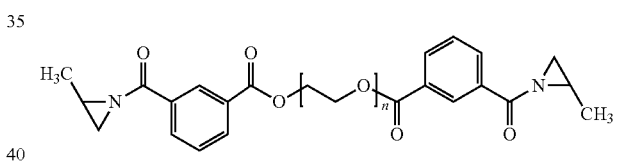

as a pale yellow liquid. A 40 weight percent solution of this material in toluene was then prepared.

Preparatory Example P21

Acid-containing Polystyrene

An acid-terminated (acid-containing) polystyrene polymer P21 was prepared. Treated styrene monomer (300 grams) was added to a 1000 mL flask along with 8 grams of ABCVA initiator, 2.5 grams of TEMPO, and 80 grams of xylene. The flask, which was fitted with a condenser and a mechanical stir blade, was placed in a controlled temperature oil bath. The contents of the flask were mixed well and purged with nitrogen for 20 minutes. The oil bath was then raised to 140° C. and held at that temperature for 12 hours. During the reaction, the initially red monomer formulation changed to a light yellowish color. The flask was cooled and 200 grams of toluene was added to dissolve the viscous polymer solution P21. Based on GPC analysis, the final product P21 had a weight average molecular weight (Mw) of 17,350 grams/mole with a polydispersity index of 1.29. Based on H-NMR analysis, the conversion of styrene monomer to polymer was about approximately 78 percent. The acid-containing polystyrene P21 was precipitated in methanol, dried, and re-dissolved into THF at 50 percent solids.

Preparatory Examples P22-P25

Various aziridinyl-containing Polystyrenes)

The acid-containing polymer solution P21 was then mixed in separate jars with various bisaziridine solutions P17-P20 according to Table 7 below to prepare various aziridinyl-containing polymeric materials. For each Preparatory Example 22-25, the amount of aziridine functionality was at least 6 fold the molar excess of acid functionality from the polymer (i.e., the moles of aziridinyl groups were at least 6 times greater than the moles of acidic groups). Samples were allowed to mix overnight and then were precipitated into cold methanol, and the solids were filtered and dried overnight under vacuum.

Percent yield was calculated as the amount of dried product recovered divided by the amount (grams) of solids used in the functionalization step that are expected to react assuming that all of the acid-containing polymer will bind to only one bisaziridine molecule and the excess bisaziridine will not precipitate in methanol.

TABLE 7

Preparation of P22-P25

| Preparatory Example | P21 (g) | P17 Solution (grams) | P18 (grams) | P19 Solution (grams) | P20 Solution (grams) | % Yield |
|---|---|---|---|---|---|---|
| P22 | 55 | 5 | | | | 97 |
| P23 | 75 | | 10 | | | 95 |
| P24 | 25 | | | 23 | | 98 |
| P25 | 20 | | | | 24 | 92 |

Preparatory Example P26-P33

Various Elastomeric Materials

Various elastomeric polymeric materials with acid pendant groups were prepared from isooctyl acrylate (IOA) and acrylic acid (AA). The Mw and acrylic acid content were systematically varied. The Mw of the samples was varied by altering the concentration of IOTG chain transfer agent as shown in Table 8. Using the relative amounts shown in Table 8 for P26-P33, isooctyl acrylate, acrylic acid, isooctylthioglycolate (IOTG), and 2-dimethoxy-2-phenylacetophenone (commercially available under the trade designation IRGACURE 651 from Ciba Specialty Chemicals (Tarrytown, N.Y.)) were mixed well in an amber bottle. A portion (26 grams) of each formulation was poured into and heat-sealed in a clear polyvinyl acetate pouch such as to eliminate any air bubbles. The pouches were prepared by heat sealing poly(ethylene vinyl acetate) film and each pouch weight about 1.4 grams. The poly(ethylene vinyl acetate) was obtained from Flint Hills Resources (Witchita, Kans.) under the trade designation VA-24 and cast into film having a thickness of 0.065 mm. Each pouch was immersed in a constant temperature water bath at 17° C. and irradiated with ultraviolet light (365 nm, 4 mW/cm$^2$) for eight minutes on each side to polymerize the monomer compositions. The products were elastomeric materials. The polymeric material was dissolved in tetrahydrofuran and analyzed using gel permeation chromatography.

TABLE 8

Preparation of Adhesive Pouches P26-P33

| Elastomeric Material Pouch | IOA (grams/ wt %) | AA (grams/ wt %) | IOTG (grams) | I-651 (grams) | MW (grams/mole) |
|---|---|---|---|---|---|
| P26 | 24.4/94 | 1.6/6 | 0.004 | 0.02 | 1,050 |
| P27 | 24.4/94 | 1.6/6 | 0.008 | 0.02 | 950 |
| P28 | 24.4/94 | 1.6/6 | 0.016 | 0.02 | 550 |
| P29 | 24.4/94 | 1.6/6 | 0.002 | 0.02 | 1,500 |
| P30 | 23.4/90 | 2.6/10 | 0.004 | 0.02 | 900 |
| P31 | 23.9/92 | 2.1/8 | 0.004 | 0.02 | 950 |
| P32 | 25.0/96 | 1.0/4 | 0.004 | 0.02 | 1,000 |
| P33 | 25.5/98 | 0.5/2 | 0.004 | 0.02 | 900 |

Preparation of Examples and Comparative Examples

Pouches of elastomeric materials P26-P33 were blended without a graft polymer (Comparative Examples C1-C5), blended with a graft polymer that was an acid-containing polymer (Comparative Examples C6-C9), or blended with a graft polymer that was an aziridinyl-containing polymer (Examples 1-26). This blending was done using a high temperature compounder commercially available under the trade designation BRABENDER (Half Size Mixer) from C. W. Brabender (Hackensack, N.J.). The pouches of elastomeric materials were mixed for 5 minutes at 100 revolutions per minute (rpm) while at 150° C. Optionally, tackifiers were added in varying amounts as pouches of elastomeric materials were added to the high temperature compounder. Once the pouch and elastomeric material appeared uniformly melted, any grafting copolymer was added. The grafting copolymer was slowly added and allowed to mix at 100 rpm for 10 minutes while at 150° C. The mixing chamber was then cooled to 100° C. and the rotation of the mixing paddles was reversed to expel and collect resulting material.

Once cooled, approximately 1 gram of the compounded material was placed between a primed PET liner (Product number 3SAB obtained from Mitsubishi (Greer, S.C.)) and a silicone treated release liner (Silphan S36 from Siliconature SPA (Godega di Sant'Urbano, Italy)). This construction was placed between the plates of a heated press from Carver, Inc. (Wabash, Ind.) with plate temperatures set at 80° C. The construction was then compressed until the compounded material was approximately 0.05 millimeters (mm) in thickness. After cooling, test samples were then cut from this construction and the silicone release layer was peeled off immediately before shear and peel adhesion tests.

Comparative Examples C1-C5

Elastomeric Material Alone

Elastomeric materials P26-P33 contained in pouches were individually mixed in the high temperature compounder using the above described procedure without a grafted polymer such as an acid-containing polymer or an aziridinyl-containing polymer. The test samples were evaluated by measuring the shear strength and peel adhesive strength. The results are shown in Table 9.

TABLE 9

Comparative Examples C1-C5

| Comparative Example | Elastomeric Material/grams | Graft Polymer | Shear Strength (minutes) | Peel Force (N/100 mm) |
|---|---|---|---|---|
| C1 | P30/26 | None | 1,930 | 56 |
| C2 | P29/26 | None | 150 | 66 |
| C3 | P28/26 | None | 40 | 69 |
| C4 | P26/26 | None | 120 | 53 |
| C5 | P33/26 | None | 5 | 74 |

Comparative Examples C6-C9

Elastomeric Material Blended with Acid-containing Polymer

Elastomeric material P26 within individual pouches was mixed in the high temperature compounder using the procedure described above with various acid-containing polymers as shown in Table 10. The test samples were evaluated by measuring the shear strength and peel adhesive strength. The results are shown in Table 10.

TABLE 10

Comparative Examples C6-C10

| Comparative Example | Elastomeric Material/grams | Acid-Containing Polymer/grams | Shear Strength (minutes) | Peel Force (N/dm) |
|---|---|---|---|---|
| C6 | P26/26 | P2/2.6 | 310 | 59 |
| C7 | P26/26 | P10/2.6 | 170 | 61 |
| C8 | P26/26 | P13/2.6 | 1,030 | 54 |
| C9 | P26/26 | P15/2.6 | 350 | 46 |

Examples 1-22

Elastomeric Material Blended with Aziridinyl-containing Polymer

Elastomeric material within individual pouches was mixed in the high temperature compounder using the procedure described above with various aziridinyl-containing polymers as shown in Table 11. The test samples were evaluated by measuring the shear strength and peel adhesive strength. The results are shown in Table 11.

TABLE 11

Examples 1-22 without tackifier

| Example | Elastomeric Material/grams | Aziridinyl-Containing Polymer/grams | Shear Strength (minutes) | Peel Force (N/dm) |
|---|---|---|---|---|
| 1 | P26/26 | P3/3.0 | 10,000+ | 22 |
| 2 | P26/26 | P3/2.6 | 4,280 | 32 |
| 3 | P26/26 | P3/2.0 | 2,750 | 34 |
| 4 | P26/26 | P3/1.3 | 1,040 | 42 |
| 5 | P26/26 | P3/0.7 | 460 | 44 |
| 6 | P33/26 | P3/3.0 | 544 | NT |
| 5 | P26/26 | P3/2.6 | 4,280 | 32 |
| 7 | P33/26 | P4/2.6 | 25 | NT |
| 8 | P26/26 | P4/2.6 | 2,020 | 45 |
| 9 | P30/26 | P7/2.6 | 10,000+ | 55 |
| 10 | P33/26 | P7/2.6 | 40 | 36 |
| 11 | P26/26 | P8/2.6 | 1,240 | 34 |
| 12 | P31/26 | P8/2.6 | 4,340 | 50 |
| 13 | P27/26 | P8/2.6 | 280 | 44 |
| 14 | P29/26 | P8/2.6 | 2,370 | 39 |
| 15 | P26/26 | P11/2.6 | 290 | NT |
| 16 | P26/26 | P12/2.6 | 3,645 | NT |
| 17 | P26/26 | P14/2.6 | 8,500 | 43 |
| 18 | P26/26 | P16/2.6 | 10,000+ | 24 |
| 19 | P26/26 | P22/2.5 | NT | NT |
| 20 | P26/26 | P23/2.6 | NT | NT |
| 21 | P26/26 | P24/2.6 | NT | NT |
| 22 | P26/26 | P25/2.8 | NT | NT |

Examples 23-26

Grafted Copolymers Plus Tackifier

Elastomeric material within individual pouches was mixed in the high temperature compounder using the procedure described above with a tackifier and an aziridinyl-containing polymer as shown in Table 12. The test samples were evaluated by measuring the shear strength. The peel strength of Example 24 was measured. The results are shown in Table 12.

TABLE 12

Examples 23-26 with tackifier

| Example | Elastomeric Material/grams | Aziridinyl-Containing Polymer/grams | Tackifier/grams | Shear Strength (minutes) | Peel Force (N/dm) |
|---|---|---|---|---|---|
| 23 | P30/21 | P3/1.7 | FORAL 85E/5.2 | 5,370 | NT |
| 24 | P26/22 | P3/2.2 | SUPERESTER A75/3.9 g | 4,900 | 38 |
| 25 | P26/22 | P3/2.2 | REGALREZ 6108/3.9 | 10,000+ | NT |
| 26 | P26/18 | P3/1.8 | REGALREZ 6108/7.8 | 10,000+ | NT |

What is claimed is:

1. A reaction mixture comprising:
   a) a first compound of Formula (I)

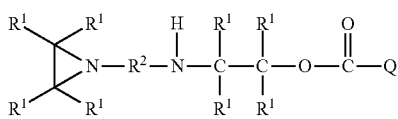

wherein
   each $R^1$ is independently hydrogen or an alkyl;
   $R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;
   $R^3$ is hydrogen or an alkyl; and
   Q is a polymeric group comprising a polymerized product of a first monomer composition comprising at least one ethylenically unsaturated monomer, wherein Q does not contain a carboxyl group; and
   b) a second compound having at least one acidic group.

2. The reaction mixture of claim 1, wherein the second compound is a polymeric material having multiple acidic groups.

3. The reaction mixture of claim 1, wherein the second compound is an elastomeric material having multiple carboxyl groups.

4. The reaction mixture of claim 1, wherein the second compound is a polymerized product of a second monomer composition comprising (a) (meth)acrylic acid and (b) at least one (meth)acrylate ester.

5. The reaction mixture of claim 1, wherein Q is has a weight average molecular weight greater than 5000 grams/mole.

6. The reaction mixture of claim 1, wherein the at least one ethylenically unsaturated monomer used to form Q is selected to have a glass transition temperature equal to at least 20° C. when polymerized as a homopolymer.

7. The reaction mixture of claim 1, wherein the first monomer composition comprises styrene, alpha-methyl styrene, or an alkyl substituted styrene.

8. The reaction mixture of claim 1, wherein the first monomer composition comprises a (meth)acrylate ester, (meth)acrylamide, or a combination thereof.

9. The reaction mixture of claim 1, wherein the group Q is a random copolymer and the first monomer composition comprises a vinyl aryl monomer and a vinyl heterocyclic monomer.

10. The reaction mixture of claim 1, wherein the group Q is a block copolymer and the first monomer composition comprises a first block of poly(vinyl aryl monmer) and a second block of poly(vinyl heterocylic monomer).

11. A grafted copolymer comprising a product of a reaction mixture comprising:
    a) a first compound of Formula (I)

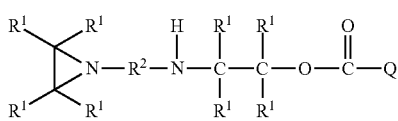

wherein
    each $R^1$ is independently hydrogen or an alkyl;
    $R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;
    $R^3$ is hydrogen or an alkyl; and
    Q is a first polymeric group comprising a polymerized product of a first monomer composition comprising at least one ethylenically unsaturated monomer, wherein Q does not contain a carboxyl group; and
    b) a second compound that is a polymeric material having at least one acidic group.

12. The grafted copolymer of claim 11, wherein the second compound is an elastomeric material prepared from a second monomer composition comprising (a) (meth)acrylic acid and (b) at least one (meth)acrylate ester.

13. The grafted copolymer of claim 11, wherein group Q has a weight average molecular weight greater than 5000 grams/mole.

14. The grafted copolymer of claim 11, wherein the at least one ethylenically unsaturated monomer used to form group Q is selected to have a glass transition temperature equal to at least 20° C. when polymerized as a homopolymer.

15. A method of making a grafted copolymer, the method comprising:
    a) forming a reaction mixture comprising
       1) a first compound of Formula (I)

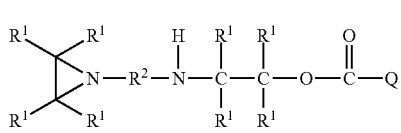

wherein
    each $R^1$ is independently hydrogen or an alkyl;
    $R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;
    $R^3$ is hydrogen or an alkyl; and
    Q is a first polymeric group comprising a polymerized product of a first monomer composition comprising at least one ethylenically unsaturated monomer, wherein Q does not contain a carboxyl group; and
       2) a second compound that is a polymeric material having at least one acidic group; and
    b) reacting an aziridinyl group of the first compound with at least one acidic group of the second polymeric material to form the grafted copolymer.

* * * * *

UNITED STATES PATENT AND TRADEMARK OFFICE
CERTIFICATE OF CORRECTION

PATENT NO.         : 8,796,390 B2
APPLICATION NO.    : 13/703160
DATED              : August 5, 2014
INVENTOR(S)        : Jason Clapper It is certified that error appears in the above-identified patent and that said Letters Patent is hereby corrected as shown below:

ON THE TITLE PAGE:

Page 2, Column 2 (Other Publications)
Line 10, delete "NMRP" and insert -- NRMP --, therefor.

IN THE SPECIFICATION:

Column 3
Line 14, delete "bicylic," and insert -- bicyclic, --, therefor.

Line 17, delete "heteroalkylincludes" and insert -- heteroalkyl includes --, therefor.

Column 4
Line 9, delete "ayrl" and insert -- aryl --, therefor.

Line 52, delete "azirdinyl" and insert -- aziridinyl --, therefor.

Line 55, delete "azridinyl" and insert -- aziridinyl --, therefor.

Column 5
Line 10 (Approx.), delete "alkyene," and insert -- alkylene, --, therefor.

Column 6
Line 4, delete "alkyene," and insert -- alkylene, --, therefor.

Column 8
Line 31, delete "alkyene," and insert -- alkylene, --, therefor.

Signed and Sealed this
Twenty-seventh Day of January, 2015

Michelle K. Lee
*Deputy Director of the United States Patent and Trademark Office*

Column 11
Line 21, delete "sytrenes" and insert -- styrenes --, therefor.

Lines 21-22, delete "dimethylstytrene," and insert -- dimethylstyrene, --, therefor.

Line 27, delete "n-vinylcarpolactam." and insert -- n-vinylcaprolactam. --, therefor.

Line 29, delete "propionate." and insert -- propionate. --, therefor.

Line 40, delete "heterocylic" and insert -- heterocyclic --, therefor.

Column 16
Lines 34-35, delete "2-tridencanol," and insert -- 2-tridecanol, --, therefor.

Line 36, delete "isoborneal," and insert -- isoborneol, --, therefor.

Line 62, delete "then" and insert -- than --, therefor.

Column 17
Line 21, delete "photoinitator," and insert -- photoinitiator, --, therefor.

Line 22, delete "photoinitator" and insert -- photoinitiator --, therefor.

Line 48, delete "naphthanate)." and insert -- naphthenate). --, therefor.

Column 18
Line 34, delete "then" and insert -- than --, therefor.

Line 46, delete "iconomeric" and insert -- ionomeric --, therefor.

Column 21
Line 10 (Approx.), delete "dimethylstytrene," and insert -- dimethylstyrene, --, therefor.

Lines 11-12 (Approx.), delete "n-vinylcarpolaetam," and insert -- n-vinylcaprolactam, --, therefor.

Line 12 (Approx.), delete "proprionate," and insert -- propionate, --, therefor.

Line 49, delete "heterocylic" and insert -- heterocyclic --, therefor.

Column 22
Lines 58-59, delete "polyfluorpolyether" and insert -- perfluoropolyether --, therefor.

Column 23
Line 43, delete "is has" and insert -- has --, therefor.

Line 63, delete "monmer" and insert -- monomer --, therefor.

Line 63, delete "heterocylic" and insert -- heterocyclic --, therefor.

Column 26
Line 50, delete "oven. _Based" and insert -- oven. Based --, therefor.

Column 27
Line 49 (Approx.), delete "isophthalaylbis" and insert -- isophthaloylbis --, therefor.

Column 28
Line 34 (Approx.), delete "isophthalaylbis" and insert -- isophthaloylbis --, therefor.

Column 29
Line 22 (Approx.), delete "methacryalte)" and insert -- methacrylate) --, therefor.

Lines 24-25 (Approx.), delete "isophthalaylbis" and insert -- isophthaloylbis --, therefor.

Line 36 (Approx.), delete "isophthalaylbis" and insert -- isophthaloylbis --, therefor.

Lines 56-57 (Approx.), delete "methacryalte)" and insert -- methacrylate) --, therefor.

Column 30
Line 55, delete "isophthalaylbis" and insert -- isophthaloylbis --, therefor.

Line 67, delete "isophthalaylbis" and insert -- isophthaloylbis --, therefor.

Column 31
Line 49, delete "isophthalaylbis" and insert -- isophthaloylbis --, therefor.

Column 32
Line 20 (Approx.), delete "135C" and insert -- 135° C. --, therefor.

Line 41, delete "isophthalaylbis" and insert -- isophthaloylbis --, therefor.

Line 55, delete "potion" and insert -- portion --, therefor.

Column 34
Line 22, delete "2-methylaziridne," and insert -- 2-methylaziridine, --, therefor.

Column 35
Line 60 (Approx.), delete "Witchita," and insert -- Wichita, --, therefor.

CERTIFICATE OF CORRECTION (continued)
U.S. Pat. No. 8,796,390 B2

IN THE CLAIMS:

Column 39

Line 32, in Claim 5, delete "is has" and insert -- has --, therefor.

Line 50, in Claim 10, delete "monmer" and insert -- monomer --, therefor.

Line 51, in Claim 10, delete "heterocylic" and insert -- heterocyclic --, therefor.

Column 40

Line 43 (Approx.), in Claim 15, delete "$R^1$is" and insert -- $R^1$ is --, therefor.